(12) United States Patent
Kamiki

(10) Patent No.: US 7,570,172 B2
(45) Date of Patent: Aug. 4, 2009

(54) KEY FOR VEHICLE AND DRUNKEN DRIVING PREVENTING DEVICE

(76) Inventor: Hiroshi Kamiki, 11-1, Honmachi 5-chome, Toyonaka-shi, Osaka, 560-0021 (JP)

( * ) Notice: Subject to any disclaimer, the term of this patent is extended or adjusted under 35 U.S.C. 154(b) by 522 days.

(21) Appl. No.: 10/571,782

(22) PCT Filed: Sep. 16, 2004

(86) PCT No.: PCT/JP2004/013538

§ 371 (c)(1), (2), (4) Date: Mar. 14, 2006

(87) PCT Pub. No.: WO2005/026477

PCT Pub. Date: Mar. 24, 2005

(65) Prior Publication Data

US 2008/0250829 A1    Oct. 16, 2008

(30) Foreign Application Priority Data

Sep. 17, 2003 (JP) ............................. 2003-324562
Jun. 4, 2004 (WO) ................. PCT/JP2004/007826

(51) Int. Cl.
*G08B 23/00* (2006.01)
*B60K 28/06* (2006.01)
*E05B 19/00* (2006.01)
(52) U.S. Cl. ........................................ 340/576; 70/344
(58) Field of Classification Search ................. 340/576; 70/344

See application file for complete search history.

(56) References Cited

U.S. PATENT DOCUMENTS

| 4,697,171 | A | 9/1987 | Suh ............................. 340/543 |
| 5,426,415 | A | 6/1995 | Prachar et al. |
| 6,198,996 | B1 * | 3/2001 | Berstis ......................... 701/36 |
| 2002/0084130 | A1 * | 7/2002 | Der Ghazarian et al. .... 180/272 |
| 2004/0085211 | A1 * | 5/2004 | Gotfried ..................... 340/576 |

FOREIGN PATENT DOCUMENTS

GB    2 186 448  A    8/1987

(Continued)

OTHER PUBLICATIONS

Canadian Office Action dated Aug. 15, 2007.

(Continued)

*Primary Examiner*—Daniel Wu
*Assistant Examiner*—John F Mortell
(74) *Attorney, Agent, or Firm*—Kratz, Quintos & Hanson, LLP

(57) ABSTRACT

The object of the invention is to provide a vehicle key capable of preventing the drunken driving. The vehicle key comprises a key portion with the forward end portion thereof insertable into the key hole of the vehicle such as a train, a motor bike and an automobile, a holder portion arranged at the base end portion of the key portion, a projection member projected from the holder portion along the key portion, a spring for urging the projection member in the direction of projection, a breath component detection means for detecting the alcohol contained in the breath of the user, and a lock mechanism for locking the projection member in a projected state in accordance with the detection result of the breath component detection means.

10 Claims, 24 Drawing Sheets

FOREIGN PATENT DOCUMENTS

| | | |
|---|---|---|
| JP | 6-82411 | 3/1994 |
| JP | 9-292354 | 11/1997 |
| JP | 2000-145224 | 5/2000 |
| JP | 2001-313696 | 11/2001 |
| JP | 2003-034234 | 2/2003 |
| JP | 2004-169524 | 6/2004 |
| WO | WO 96/32556 | * 10/1996 |

OTHER PUBLICATIONS

Russian Office Action with English translation dated Dec. 26, 2007.
New Zealand Examination Report dated Jan. 15, 2008.

* cited by examiner (a)

(b)

(a)

(b)

(a)

(b)

(a)

(b)

KEY FOR VEHICLE AND DRUNKEN DRIVING PREVENTING DEVICE

The present application incorporates the contents of International Application No. PCT/JP2004/13538 filed on Sep. 16, 2004 and claims priority under CFR 1.57(b) of Japanese Patent Application No. JP 2003-324562 filed Sep. 17, 2003 and International Patent Application No. PCT/JP2004/007826 filed on Jun. 4, 2004.

BACKGROUND OF THE INVENTION

1. Field of the Invention

This invention relates to a key for a vehicle for starting a prime mover of a vehicle such as a train, a motor bike, or an automobile and a drunken driving preventing device.

2. Description of the Related Art

In recent years, traffic accidents caused by the drunken driving have closed up as a problem. Especially, the moral of the professional drivers of trucks and buses has declined to such a degree that serious traffic accidents due to drunken driving are often caused by the professional drivers. In addition to drunken driving, some people drive a vehicle while taking drugs such as narcotics or thinner.

Means for suppressing the drunken driving include a mobile phone having built therein an alcohol sensor (Japanese Unexamined Patent Publication No. 2001-313696), or an alcohol detector mounted on the room mirror of an automobile (Japanese Unexamined Patent Publication NO. 09-292354).

The alcohol sensors described above, however, merely detect alcohol contained in the breath of a user and incapable of preventing the user from drunken driving. Also, there has not been such a sensor capable of preventing a person from driving while taking drugs.

SUMMARY OF THE INVENTION

This invention has been developed in view of the situation described above, and an object of the present invention is to provide a key for a vehicle and a drunken driving preventing device that are capable of preventing the drunken driving and/or the driving while taking drugs.

In order to solve this problem, a vehicle key according to a first aspect of the invention is a vehicle key capable of being inserted into a key hole of a vehicle including a train, a motorbike, and an automobile, and used for starting a prime mover of the vehicle, the key comprising: a key portion having a forward end portion insertable into the key hole of the vehicle; a holder portion disposed at a base end portion of the key portion; an insert prevention means projectable from the holder portion for preventing the key portion from being inserted into the key hole of the vehicle; and a breath component detection means for detecting at least one of alcohol and drug contained in a breath of a user, wherein the insert prevention means is adapted to be accommodated in the holder portion in accordance with a detection result of the breath component detection means.

The insert prevention means includes: a projection member projectable from the holder portion along the key portion; a spring for urging the projection member in a direction of the projection; and a lock mechanism for locking and maintaining the projection member in a projected state, and the lock mechanism is adapted to unlock the projection member in accordance with the detection result of the breath component detection means.

The lock mechanism includes: a plunger configured as a member engageable with a depression on a side surface of the projection member, and disposed on the holder portion linearly movably from an engaging position, at which the plunger engages with the depression of the projection member, to an evacuation position, at which the plunger fails to engage with the depression of the projection member; and a drive means for moving the plunger from the engaging position to the evacuation position in accordance with the detection result of the breath component detection means. The breath component detection means, on the other hand, is configured so as to include at least one of an alcohol sensor and a drug sensor; and a control unit for controlling an on/off operation of the drive means in accordance with an output signal of the at least one of the alcohol sensor and the drug sensor. The projection member may be disposed on the key portion.

A vehicle key according to a second aspect of the invention is capable of being inserted into a key hole of a vehicle including a train, a motorbike, and an automobile, and used for starting a prime mover of the vehicle, the key comprising: a key portion having a forward end portion insertable into the key hole of the vehicle including a train, a motorbike, and an automobile; a holder portion for slidably holding a base end portion of the key portion and adapted to accommodate at least a part of the forward end portion of the key portion; a retaining means for retaining the key portion in a state accommodated in the holder portion; a breath component detection means for detecting at least one of alcohol and drug contained in a breath of a user; and a projection means for, in accordance with a detection result of the breath component detection means, projecting an entirety of the forward end portion of the key portion so as to be insertable into the key hole.

It is preferable that the retaining means is configured as a spring for urging the key portion in a direction of the accommodation, and for setting the forward end portion in a state uninsertable into the key hole, and the projection means is configured as a pressure mechanism for, in accordance with the detection result of the breath component detection means, projecting the entirety of the forward end portion of the key portion so as to be insertable into the key hole against the urging force of the spring. In this case, the breath component detection means is configured so as to include at least one of an alcohol sensor and a drug sensor; and a control unit for controlling an on/off operation of the pressure mechanism in accordance with an output signal of the at least one of the alcohol sensor and the drug sensor.

A vehicle key according to a third aspect of the invention is for outputting a start permit signal to a vehicle including a train, a motorbike, and an automobile, and for either starting a prime mover of the vehicle or setting the prime mover in a ready state for starting, the key comprising: a signal output means for outputting the start permit signal; a breath component detection means for detecting at least one of alcohol and drug contained in a breath of a user; and a prevention means for preventing the output of the start permit signal to the vehicle from the signal output means in accordance with a detection result of the breath component detection means.

The prevention means is configured so as to include a shield means for shielding the start permit signal output from the signal output means; and a drive means for moving the shield means from a shield position, at which the start permit signal of the signal output means is shielded, to an evacuation position, at which the start permit signal fails to be shielded, in accordance with the detection result of the breath component detection means.

The breath component detection means includes an alcohol sensor and/or a drug sensor, and a control unit for controlling an on/off operation of one of the signal output means and the drive means, in accordance with an output signal of the at least one of the alcohol sensor and the drug sensor, thereby functioning as the prevention means.

The vehicle key according to the first, second and third aspects of the invention may comprise a sensing means for reading a physical feature of the user, wherein the breath component detection means includes: at least one of an alcohol sensor and a drug sensor; and a control unit for authenticating the user based on sensing data of the sensing means, for performing a alcohol and/or drug to determine whether alcohol and/or drug is contained in the breath of the user in accordance with an output signal of the alcohol sensor and/or the drug sensor, and the control unit has a function of controlling an on/off operation of one of the drive means, the pressure means, and the signal output means, either in a case where the user is not authenticated as a result of the authentication, or in a case where alcohol and/or drug is determined to be contained in the breath of the user as a result of the alcohol and/or drug determination.

The control means is desirably configured to have a function of performing, within a predetermined period of time before and after the authentication, the determination of at least one of alcohol and drug. In this case, the sensing means is desirably one of a voice detection means for detecting voice of the user, and an image pickup means for picking up an image of an iris of an eye of the user.

Also, the vehicle key according to the first aspect of the invention can be configured to further include a position detection means for detecting that the projection member is accommodated in the holder portion; and a memory unit for recording a detection result of the position detection means.

Further, the vehicle key according to the first, second and third aspects of the invention may further include a GPS (Global Positioning System) transmitter.

Also, a drunken driving preventing device according to a first aspect of the invention is either mounted on or built in a vehicle including a train, a motorbike, and an automobile, the device comprising: a breath component detection means for detecting at least one of alcohol and drug contained in a breath of a user; and an insert prevention means for preventing a vehicle key from being inserted into the key hole of the vehicle in accordance with a detection result of the breath component detection means.

A drunken driving preventing device according to a second aspect of the invention is either mounted on or built in a vehicle including a train, a motorbike, and an automobile, the device comprising: a breath component detection means for detecting alcohol and/or drug contained in a breath of a user; and an operation prevention means for preventing a start operation unit for starting a prime mover of the vehicle in accordance with a detection result of the breath component detection means.

A drunken driving preventing device according to a third aspect of the invention is either mounted on or built in a vehicle capable of starting a prime mover in response to a start permit signal output from a vehicle key, the vehicle including a train, a motorbike, and an automobile, the device comprising: a breath component detection means for detecting at least one of alcohol and drug contained in a breath of a user; and an open/close means for openably/closably shielding a receiving unit for receiving the start permit signal for the vehicle in accordance with a detection result of the breath component detection means.

The breath component detection means is configured to include at least one of an alcohol sensor and a drug sensor; and a control unit for controlling an on/off operation of one of the insert prevention means, the operation prevention means, and the open/close means in accordance with an output signal of the at least one of the alcohol sensor and the drug sensor.

The drunken driving preventing device according to the first, second and third aspects of the invention may be configured to further include a sensing means for reading the physical feature of the user. The breath component detection means is configured to include at least one of an alcohol sensor and a drug sensor; and a control unit for authenticating the user based on sensing data of the sensing means, and performs a determination of at least one of alcohol and drug, in accordance with an output signal of the at least one of the alcohol sensor and the drug sensor, for determining whether at least one of alcohol and drug is contained in the breath of the user, and the control unit has a function of controlling an on/off operation of one of the insert prevention means, the operation prevention means, and the switching means, either in a case where the user is not authenticated as a result of the authentication, or in a case where at least one of alcohol and drug is determined to be contained in the breath of the user as a result of the determination of at least one of alcohol and drug.

The control means desirably has a function of performing, within a predetermined period of time before and after the authentication, the determination of at least one of alcohol and drug. In this case, the sensing means is desirably one of a voice detection means for detecting voice of the user, and an image pickup means for picking up an image of an iris of an eye of the user.

The alcohol sensor may be an independent entity. Also, the vehicle key may further include a GPS transmitter.

The vehicle key according to the first aspect of the invention is so configured that the insert prevention means is projected from the holder portion, whereby the insertion of the key portion into the key hole of the vehicle is prevented and the insert prevention means can be accommodated in the holder portion in accordance with the detection result of the breath component detection means. Specifically, in the case where the breath component detection means fails to detect an alcohol and/or a drug in the breath of the user, the insert prevention means can be accommodated in the holder portion. As a result, the key portion can be inserted into the key hole of the vehicle and the drive unit of the vehicle can be started. In the case where an alcohol and/or a drug is detected in the breath of the user by the breath component detection means, on the other hand, the insert prevention means is kept projected from the holder portion and therefore the key portion cannot be inserted into the key hole of the vehicle. As a result, the key portion cannot be inserted into the key hole of the vehicle, and therefore the prime mover of the vehicle cannot be started. In this way, the drunken driving and/or driving while taking drugs can be effectively prevented. In addition, because no design change of the vehicle is required, such a key can be applied in the use for vehicles already on the market.

The vehicle key according to the second aspect of the invention is so configured that the insert prevention means includes a projection member projected along the key portion from the holder portion, a spring for urging the projection member in the direction of projection and a lock mechanism for locking and maintaining the projection member in a projected state. This insert prevention means can be implemented with a simple structure and therefore can advantageously reduce the cost.

The vehicle key according to the third aspect of the invention is so configured that the lock mechanism includes a plunger arranged on the holder portion movably linearly from an engaging position where it engages the depression of the projection member to an evacuation position where it does not engage the depression of the projection member and a drive means for moving the plunger from the engaging position to the evacuation position. The lock mechanism can be configured by combining the existing members and therefore the cost can be advantageously reduced.

With the vehicle key according to the fourth aspect of the invention, existing alcohol sensors and/or drug sensors can be used, thereby leading to the advantage that the cost is further reduced.

With the vehicle key according to the fifth aspect of the invention, the projection member is arranged on the key portion, and therefore the key portion cannot be inserted into the key hole while the projection member is projected. As a result, like the key described above, the drunken driving and/or the driving while taking drugs can be effectively prevented.

The vehicle key according to the sixth aspect of the invention is so configured that at least a part of the forward end portion of the key portion is maintained in the state accommodated in the holder portion by the retaining means, and the breath component detection means detects the alcohol and/or the drug contained in the breath of the user, and in accordance with the detection result of this breath component detection means, the whole forward end portion of the key portion can be projected and inserted into the key hole by the projection means. Specifically, in the case where no alcohol is detected, the whole forward end portion of the key portion is projected from the holder portion, and therefore the key portion can be inserted into the keyhole to start the prime mover of the vehicle. In the case where the alcohol and/or the drug is detected, on the other hand, the part of the forward end portion of the key portion is maintained in the state accommodated in the holder, and therefore the key portion cannot be inserted into the key hole of the vehicle and the prime mover of the vehicle cannot be started. As a result, the drunken driving and/or the driving while taking drugs can be effectively prevented. Also, because no design change of the vehicle is required, such a key can also be applied in the use for the vehicles already on the market.

The vehicle key according to the seventh aspect of the invention comprises a spring for urging the key portion in the direction of accommodation and setting the forward end portion thereof in a state unable to be inserted into the key hole, and the projection means is a pressure mechanism for projecting the whole forward end portion of the key portion into a state adapted to be inserted into the key hole against the urging force of the spring in accordance with the detection result of the breath component detection means. The implementation of this simple configuration can reduce the cost advantageously.

With the vehicle key according to the eighth aspect of the invention, existing alcohol sensors and/or drug sensors can be used, and therefore the cost can be further reduced advantageously.

With the vehicle key according to the ninth aspect of the invention, the alcohol and/or the drug contained in the breath of the user is detected by the alcohol and/or drug sensor, and in accordance with the output signal of the alcohol and/or drug sensor, the prevention means prevents the start permit signal of the signal output means from being output to the vehicle. Specifically, in the case where no alcohol and/or drug is detected, the start permit signal is output to the vehicle from the signal output means, thereby the prime mover of the vehicle can be started or set in a state capable of being started. In the case where the alcohol and/or the drug is detected, on the other hand, the output of the start permit signal from the signal output means to the vehicle is prevented by the prevention means, and therefore the prime mover of the vehicle cannot be started or set in a state capable of being started. As a result, the drunken driving and/or driving while taking drugs can be effectively prevented. In addition, because no design change is required, such a key can also be applied in the use for the vehicles already on the market.

With the vehicle key according to the tenth aspect of the invention, the prevention means includes a shield means for shielding the start permit signal that is output from the signal output means and a drive means for moving the shield means, in accordance with the detection result of the breath component detection means, from a shield position where the start permit signal of the signal output means can be shielded to an evacuation position where the start permit signal cannot be shielded. In the case where the alcohol and/or the drug is not detected, therefore, the shield means is moved to the evacuation position whereby the start permit signal of the signal output means can be output to the vehicle. Thus, the prime mover of the vehicle can be started or set in a state capable of being started. In the case where the alcohol and/or the drug is detected, on the other hand, the shield means is maintained in the shield position, and therefore the prime mover of the vehicle cannot be started nor set in a state capable of being started. By this, it is possible to effectively prevent the drunken driving and/or the driving while taking drugs. In addition, because no design change of the vehicle is required, such a key can be applied in the use for the vehicles already on the market.

With the vehicle key according to the eleventh aspect of the invention, the alcohol and/or the drug contained in the breath of the user is detected by the alcohol sensor and/or the drug sensor, and in accordance with the output signal of the alcohol sensor and/or the drug sensor, the control unit controls the on/off operation of the signal output means, thereby functioning as a prevention means. Specifically, in the case where the alcohol and/or drug is not detected, the signal output means is turned on (i.e. in a state capable of outputting the start permit signal) to output the start permit signal, so that the prime mover of the vehicle can be started or set in a state capable of being started. In the case where the alcohol and/or the drug is detected, on the other hand, the signal output means is maintained off (i.e. in a state incapable of outputting the start permit signal), and therefore the prime mover of the vehicle cannot be started or set in a state capable of being started. This configuration can effectively prevent the drunken driving and/or the driving while taking drugs.

With the vehicle key according to the twelfth aspect of the invention, the control unit of the breath component detection means performs the authentication to determine the user is the legitimate user through the sensing means and the alcohol/drug determination to determine whether the alcohol and/or the drug is contained in the breath of the user in accordance with the output signal of the alcohol sensor and/or the drug sensor of the breath component detection means. In the case where the user is not successfully authenticated as the result of the authentication process or the alcohol and/or drug determination result shows that the breath of the user contains alcohol and/or drug, then the on/off operation of the drive means, the pressure means or the signal output means is controlled. Specifically, in the case where the person using the key is the legitimate user and the breath of the user contains no alcohol and/or drug, the prime mover of the vehicle can be started, while in the case where it has been determined that the person using the key is not the legitimate user or the breath of the user contains alcohol and/or drug, the prime mover cannot be started. As a result, it is possible to prevent unfair use of the key that, for example, a person other than the user exhales the breath on the alcohol sensor and/or the drug sensor in place of the user. Also, a person other than the user cannot start the prime mover of the vehicle using the vehicle key, and therefore the vehicle is prevented from being stolen.

With the vehicle key according to the thirteenth aspect of the invention, the alcohol and/or drug determination is carried out within a predetermined time (say, one second or two) before and after the authentication process, and therefore the unfair use of the key is advantageously prevented in which a person other than the user exhales on the alcohol sensor and/or the drug sensor in place of the user.

With the vehicle key according to the fourteenth aspect of the invention, a voice detection means for detecting the voice of the user or an image pickup means for picking up the image of the iris of the eyes of the user is used as a sensing means. Therefore, the user is required to exhale on the alcohol sensor within a predetermined time (one second or two) before or after the time when the voice uttered by the user is detected by the voice detection means or the time when the image of the iris of the user is picked up by the camera, and it is difficult for a person other than the user to exhale on the alcohol sensor in place of the user within the predetermined time. Therefore the unfair use may be more advantageously prevented.

With the vehicle key according to the fifteenth aspect of the invention, the position detection means detects that the projection member is accommodated in the holder portion (i.e. the user is riding in the vehicle), and this detection result is recorded in a memory unit as the record of the user riding in the vehicle. Therefore, by outputting the data on the memory unit at predetermined time intervals, the history of the user riding in the vehicle becomes accessible and may be utilized for the vehicle operation management.

With the vehicle key according to the sixteenth aspect of the invention comprising a GPS transmitter, the user position can be retrieved or the vehicle operation management can be carried out by receiving the GPS signal of the GPS transmitter by a management center or the like.

With the drunken driving preventing device according to the seventeenth aspect of the invention, in the case where the alcohol and/or the drug is detected in the breath of the user by the breath component detection means, the insertion of the key into the key hole is prevented by the insert prevention means, and therefore the prime mover of the vehicle cannot be started. Thus, it is possible to prevent the drunken driving effectively.

With the drunken driving preventing device according to the eighteenth aspect of the invention, upon detection of the alcohol and/or the drug in the breath of the user by the breath component detection means, the operation of the start operation unit is prevented by the operation prevention means, and therefore the prime mover of the vehicle cannot be started. Thus, it is possible to prevent the drunken driving effectively.

With the drunken driving preventing device according to the nineteenth aspect of the invention, upon detection of the alcohol and/or the drug in the breath of the user by the breath component detection means, the receiving unit is covered by the open/close means, and therefore the prime mover of the vehicle cannot be started. Thus, it is possible to prevent the drunken driving effectively.

With the drunken driving preventing device according to the twentieth aspect of the invention, existing alcohol sensors and/or the existing drug sensors can be used, and therefore the cost may be advantageously reduced.

With the drunken driving preventing device according to the twenty-first aspect of the invention, the control unit of the breath component detection means carries out the authentication for identifying the user through the sensing means, and the alcohol and/or drug determination for determining whether the alcohol and/or the drug is contained in the breath of the user in accordance with the output signal of the alcohol sensor and/or the drug sensor of the breath component detection means. In a case when the authentication result shows that the user is not successfully identified or when the alcohol and/or drug determination result shows the alcohol and/or the drug is contained in the breath of the user, the control unit controls the on/off operation of the insert prevention means, the operation prevention means or the open/close means. Specifically, in the case where the person using the key is the legitimate user and alcohol and/or drug is not contained in the breath of the user, the prime mover of the vehicle can be started, while in the case where the person using the key is not the legitimate user or it is determined that alcohol and/or drug is contained in the breath of the user, then the prime mover cannot be started. As a result, unfair use of the key in which a person other than the legitimate user exhales on the alcohol sensor and/or the drug sensor on behalf of the user can be prevented. Also, because a person other than the user cannot start the prime mover of the vehicle using the key, the vehicle is prevented from being stolen using the key.

With the drunken driving preventing device according to the twenty-second aspect of the invention, the alcohol and/or drug determination is carried out within a predetermined time (say, a second or two) before and after the authentication, and therefore the unfair use of the key by which a person other than the legitimate user exhales on the alcohol sensor and/or the drug sensor on behalf of the user can be advantageously prevented.

With the drunken driving preventing device according to the twenty-third aspect of the invention, the voice detection means for detecting the voice of the user or the image pickup means for picking up an image of the iris of the eyes of the user is used as a sensing means. Therefore, the user is required to exhale on the alcohol sensor within a predetermined time (a second or two) before or after the time when the voice uttered by the user is detected or when the image of the iris of the user is picked up, and it is difficult for a person other than the user to exhale on the alcohol sensor in place of the user within the predetermined time. Therefore, the unfair use may be more advantageously prevented.

With the drunken driving preventing device according to the twenty-fourth aspect of the invention, the alcohol sensor makes up an independent entity, and therefore can be installed or held at an easy-to-use (easy-to-breathe on) place, thereby further improving the operating convenience.

With the drunken driving preventing device according to the twenty-fifth aspect of the invention, including a GPS transmitter, the user position can be retrieved or the vehicle operation management can be carried out by receiving the GPS signal of the GPS transmitter by a management center or the like.

DETAILED DESCRIPTION OF THE PREFERRED EMBODIMENTS

A vehicle key according to embodiments of the invention is explained below.

First Embodiment

Figure 1:
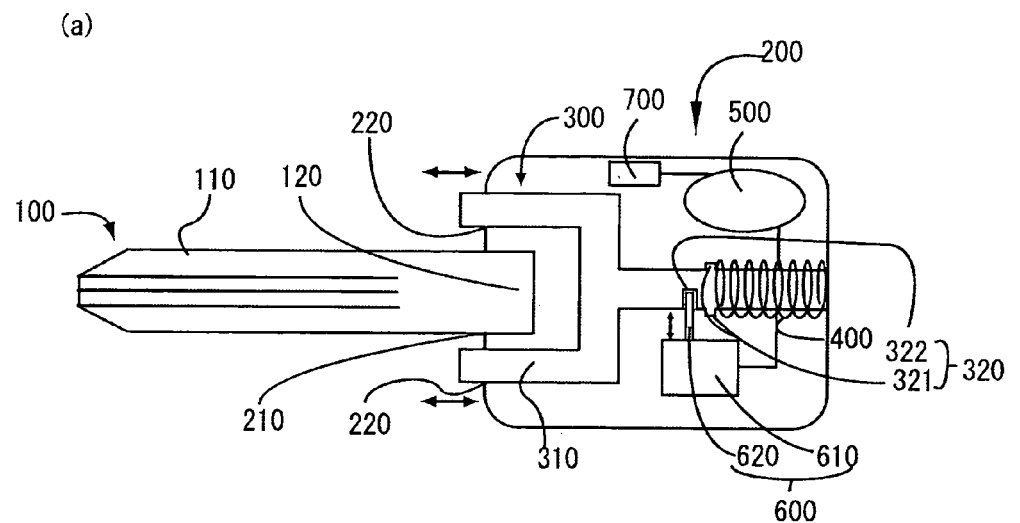
FIG. 1 is a schematic front view of the holder portion of the vehicle key shown in perspective according to a first embodiment of the invention.
Figure 1:
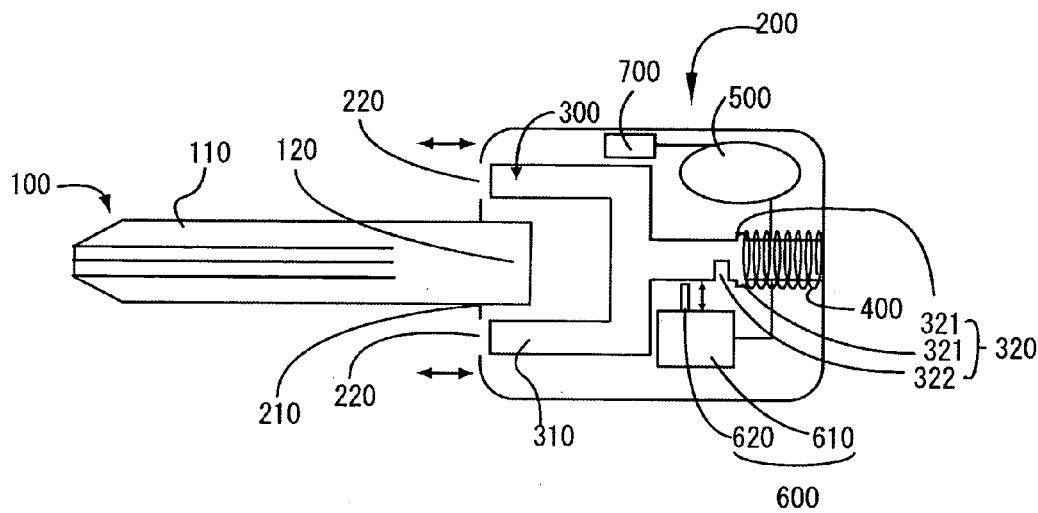

First, a vehicle key according to a first embodiment is explained with reference to the drawings. FIG. 1 is a schematic front view showing the holder portion of the vehicle key in perspective according to the first embodiment of the invention, FIG. 2 a circuit diagram of the same key, and FIG. 3 a flowchart of the alcohol concentration measurement program.

The vehicle key shown in FIG. 1 includes a key portion 100 of which the forward end portion 110 is to be inserted into a key hole (not shown) of the vehicle such as a train, a motorbike or an automobile and a holder portion 200 formed at the base end portion 120 of the key portion 100. In this case, the forward end portion 110 of the key portion 100 constitutes a key proper to be inserted into the key hole of the vehicle.

The holder portion 200 is a rectangular case from which the holder portion 200 is projected, and has built therein an insert prevention means for preventing the key portion 100 from being inserted into the key hole of the vehicle, a breath component detection means 500 for detecting the alcohol contained in the breath of the user, a power switch 700 and a power battery not shown.

A mounting hole 210 for the key portion 100 and through holes 220, 220 located on both sides of the mounting hole 210 and from which the projection member 300 of the insert prevention means can be projected are open at one end surface of the holder portion 200. Also, an intake hole (not shown) and a mounting hole (not shown) for the power switch 700 are opened at points opposed to the alcohol sensor 510 of the breath component detection means 500 on the surface of the holder portion.

The insert prevention means is configured to include a projection member 300 projected along the key portion 100 from the holder portion 200, a spring 400 for energizing the projection member 300 in the direction of projection, and a lock mechanism 600 for locking and maintaining the projection member 300 in a projected state in accordance with the detection result of the breath component detection means 500.

The projection member 300 is a resin component part including a forward end portion 310, in a shape of square with one side open projected from the through holes 220, 220, and a rear end portion 320 connected with the forward end portion 310. The rear end portion 320 includes protrusions 321, 321 in contact with an end of the spring 400 and a depression 322 engaged by the plunger 620 of the lock mechanism 600.

The spring 400 is a coil spring. This spring 400 is interposed between the protrusions 321, 321 of the rear end portion 320 of the projection member 300 and the inside of the other end surface of the holder portion 200 thereby to urge the projection member 300 in the direction of projection along the key portion 100.

The lock mechanism 600 includes a solenoid (i.e. a drive means) 610 excited in accordance with the detection result of the breath component detection means 500, and a plunger 620 movable linearly by the solenoid 610 and adapted to engage the depression 310 formed on the projection member 300. Specifically, as shown in FIG. 1(a), the plunger 620 is projected to engage the depression 322 formed on the projection member 300 while the solenoid 610 is not excited. As a result, the projection member 300 is locked and maintained in a projected state (engaging position). In the case where the solenoid 610 is excited in accordance with the detection result of the breath component detection means 500, on the other hand, as shown in FIG. 1(b), the plunger 620 thus far engaged in the depression 322 is evacuated and thereby the locked state is canceled (evacuation position).

The power switch 700 is a hold-down switch available on the market. The power switch 700 is turned on when held down.

Figure 2:
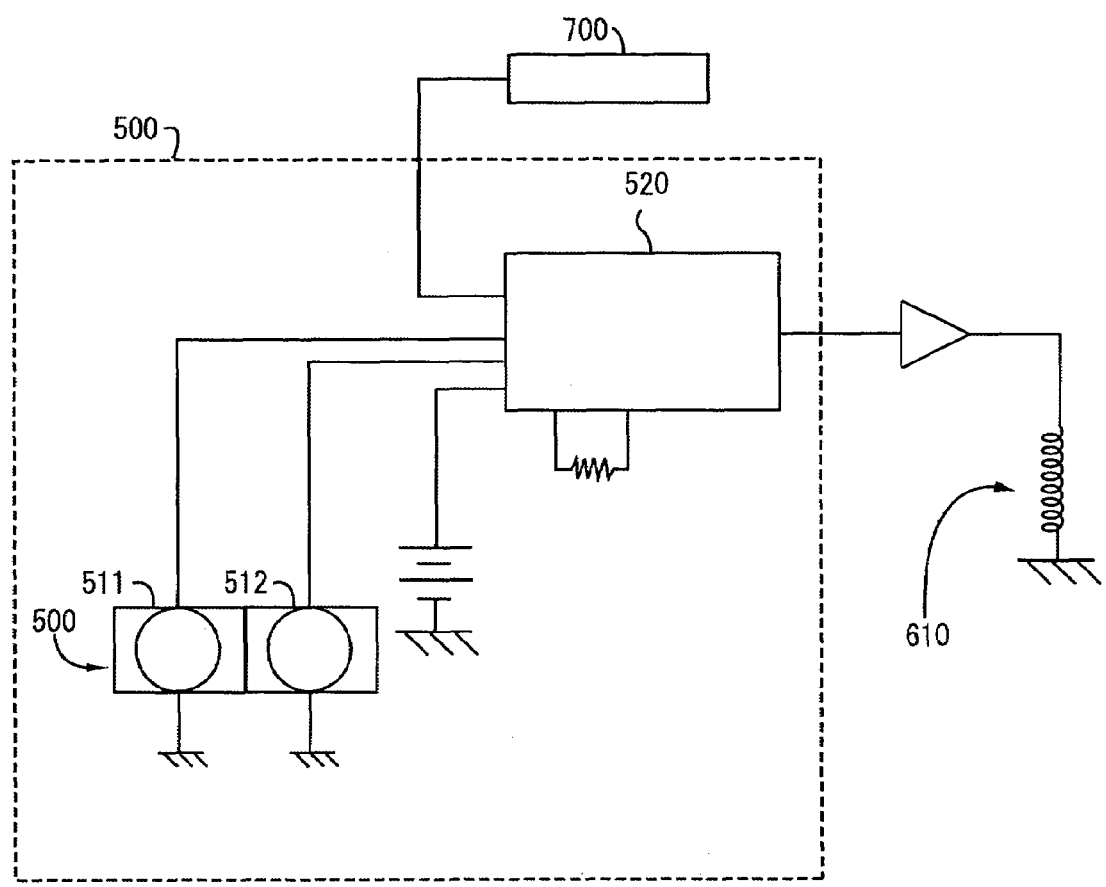
FIG. 2 is a circuit diagram of the same key.

The breath component detection means 500, as shown in FIG. 2, includes an alcohol sensor 510 and a control unit 520 for controlling the excitation of the solenoid 610 in accordance with the output signal of the alcohol sensor 510.

The alcohol sensor 510 is a semiconductor gas sensor including a first gas sensor 511 for detecting the alcohol concentration in the breath of the user as a voltage and a second gas sensor 512 for detecting the carbon dioxide in the breath of the user as a voltage.

The control unit 520 is a one-chip microcomputer. The input port of the control unit 520 is connected with the first gas sensor 511, the second gas sensor 512 and the power switch 700, while the output port thereof is connected with a solenoid 610 through the power switch 700 and an amplifier. The memory of the control unit 520 has stored therein the alcohol concentration of 0.25 mg/L in the breath as a reference value.

Specifically, the control unit 520 has the function of detecting the carbon dioxide in the breath of the user based on the output signal of the second gas sensor 512, determining whether the user exhaled or not, measuring the alcohol concentration in the breath of the user based on the output signal of the first gas sensor 511, comparing this measurement value with the reference value, and in the case where the result shows that the measurement value exceeds the reference value, exciting the solenoid 610.

Also, the memory has stored therein an alcohol concentration measurement program (FIG. 3) executed by holding down the power switch 700. The control unit 520 realizes the aforementioned functions by executing this program.

The control unit 520 has built therein a timer circuit which is set to turn off upon lapse of a predetermined time after holding down 700.

The operation of each part of the vehicle key having the aforementioned configuration and the method of using the vehicle key are explained below.

First, in the off state, the projection member 300 is energized by the spring 400 and locked by the lock mechanism 600, thereby being maintained in a projected state. As a result, even in the case where the insertion of the key portion 100 into the key hole of the vehicle is attempted, the forward end portion 310 of the projection member 300 comes into contact with the edge of the key hole so that only a part of the forward end portion 110 of the key portion 100 can be inserted into the key hole.

The user trying to ride a vehicle holds down the power switch 700. Then, the control unit 520 executes the alcohol concentration measurement program shown in FIG. 3 and turns on the timer circuit.

After that, based on the output signal of the second gas sensor 512, it is determined whether carbon dioxide has been detected or not (S1). In other words, it is determined whether the user has exhaled on the alcohol sensor 510 of the holder portion 200 or not.

Upon determination that no breath is exhaled, the process of step 1 is repeated, while on determination that the breath is exhaled, the alcohol concentration in the breath of the user is measured based on the output signal of the first gas sensor 511 thereby to determine whether the alcohol concentration is not less than the reference value (S2).

As a result, upon determination that the alcohol concentration is not more than the reference value, the solenoid 610 is excited and the plunger 620 is evacuated, thereby unlocking the projection member 300 (S3). After that, the program execution is terminated.

With the projection member 300 unlocked in this way, the user inserts the key portion 100 into the key hole of the vehicle. In the process, the forward end portion 310 of the projection member 300 comes into contact with the edge of the key hole. Since the projection member is unlocked, however, the projection member 300 can be pushed into the holder portion 200 against the urging force of the spring 400. Thus, the whole forward end portion 110 of the key portion 100 can be inserted into the key hole. As a result, the prime mover of the vehicle can be started.

Upon determination that the alcohol concentration is not less than the reference value at step 2, on the other hand, the program execution is terminated. Specifically, the plunger 620 is kept engaged in the depression 322, and the projection member 300 is kept projected, so that the user cannot start the prime mover of the vehicle.

Upon lapse of a predetermined time with the timer circuit turned on in the process of steps 1 to 3, the operation is turned off. Specifically, in the case where the breath is not exhaled on the alcohol sensor 510 for a predetermined time after holding down 700, the operation turns off. Also, upon lapse of a predetermined time after unlocking the projection member 300 with the solenoid 610 excited at step 3, the operation is turned off. Then, the solenoid 610 ceases to be excited, and therefore the projection member 300 is locked again. In this way, alcohol is measured immediately before the operation starts. Power can be saved by turning off the operation within a predetermined time.

Upon lapse of the predetermined time described above with the key portion 100 inserted in the key hole (i.e. in operation), the operation is turned off. At the same time, the solenoid 610 is deenergized and the plunger 620 is projected. Since the projection member 300 is depressed by the edge of the key hole and kept pushed in by the holder portion 200, however, the plunger 620 fails to engage the depression 322 of the projection member 300.

When the key is pulled off from the key hole by the user at the end of driving, the projection member 300 is projected by the force of the spring 400. At the same time, the plunger 620 engages the depression 322 of the projection member 300, which is then locked again.

With this vehicle key, assume that the alcohol concentration in the breath of the user is not more than the reference value. The projection member 300 is unlocked, and therefore pushed into the holder portion 200 against the urging force of the spring 400, while the whole forward end portion 110 of the key portion 100 can be inserted into the key hole of the vehicle. In the case where the alcohol concentration in the breath of the user is not less than the reference value, on the other hand, the projection member 300 is not unlocked and kept projected along the key portion 100. Therefore, the whole forward end portion 110 of the key portion 100 cannot be inserted into the key hole, and the prime mover of the vehicle cannot be started. As a result, the drunken driving can be effectively prevented.

Second Embodiment

Figure 4:
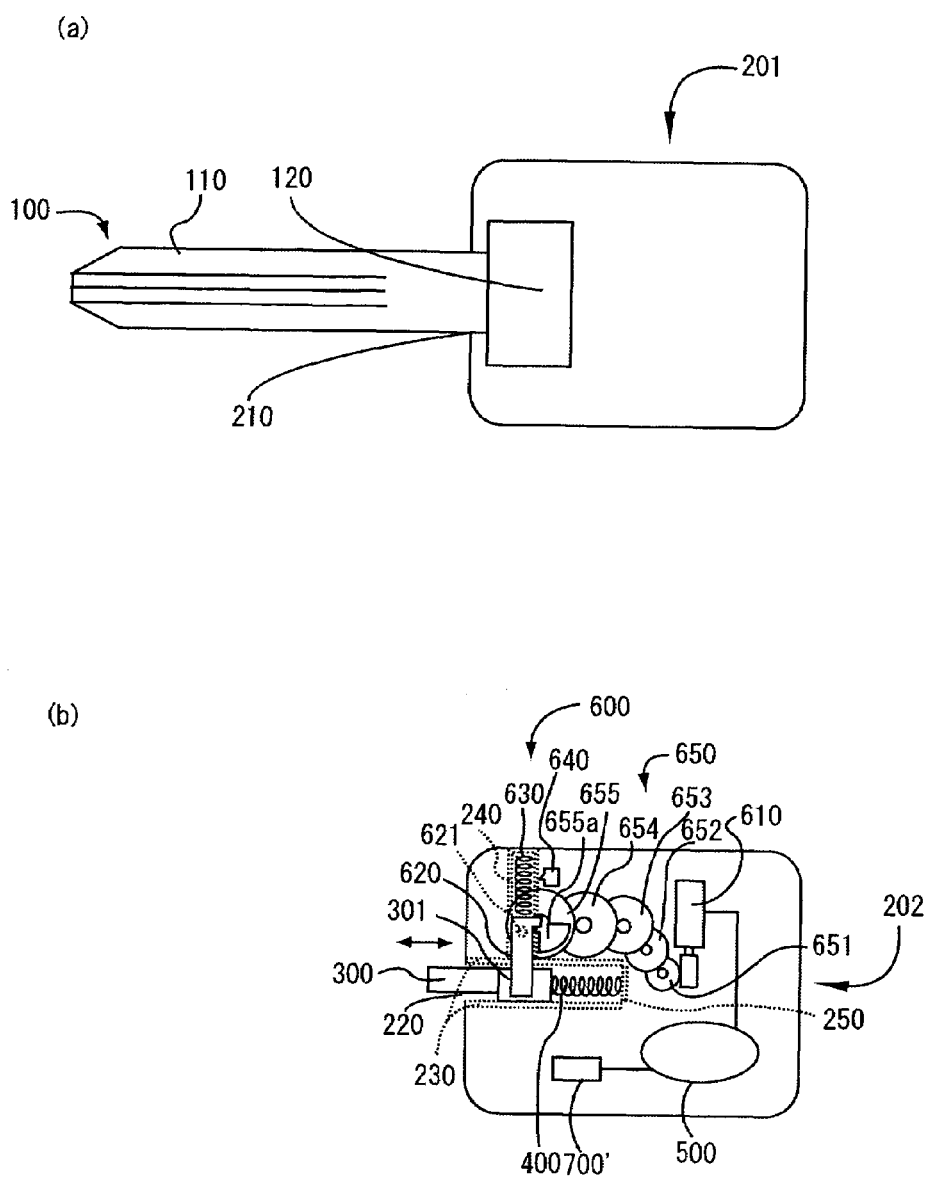
FIGS. 4(a) to (b) are Schematic diagrams of the vehicle key according to a second embodiment of the invention, in which (a) is a diagram showing one case, and (b) shows another case.
Figure 5:
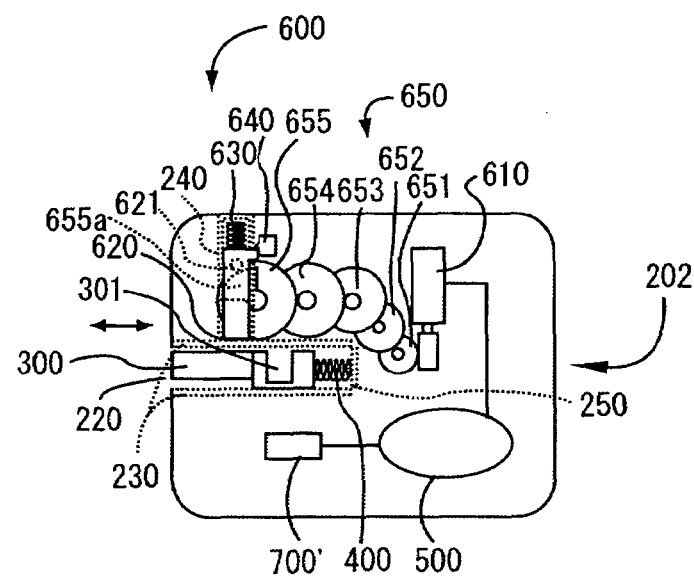
FIG. 5 is a schematic diagram of the other case accommodating the projection member of the key.
Figure 6:
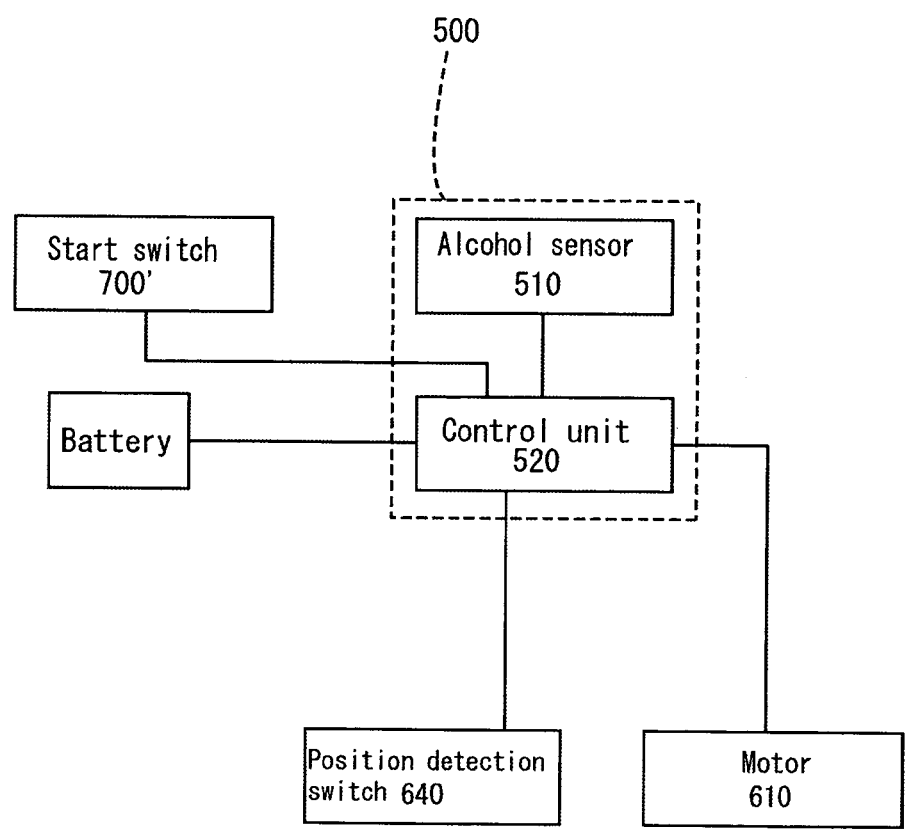
FIG. 6 is a block diagram of the same key.
Figure 7:
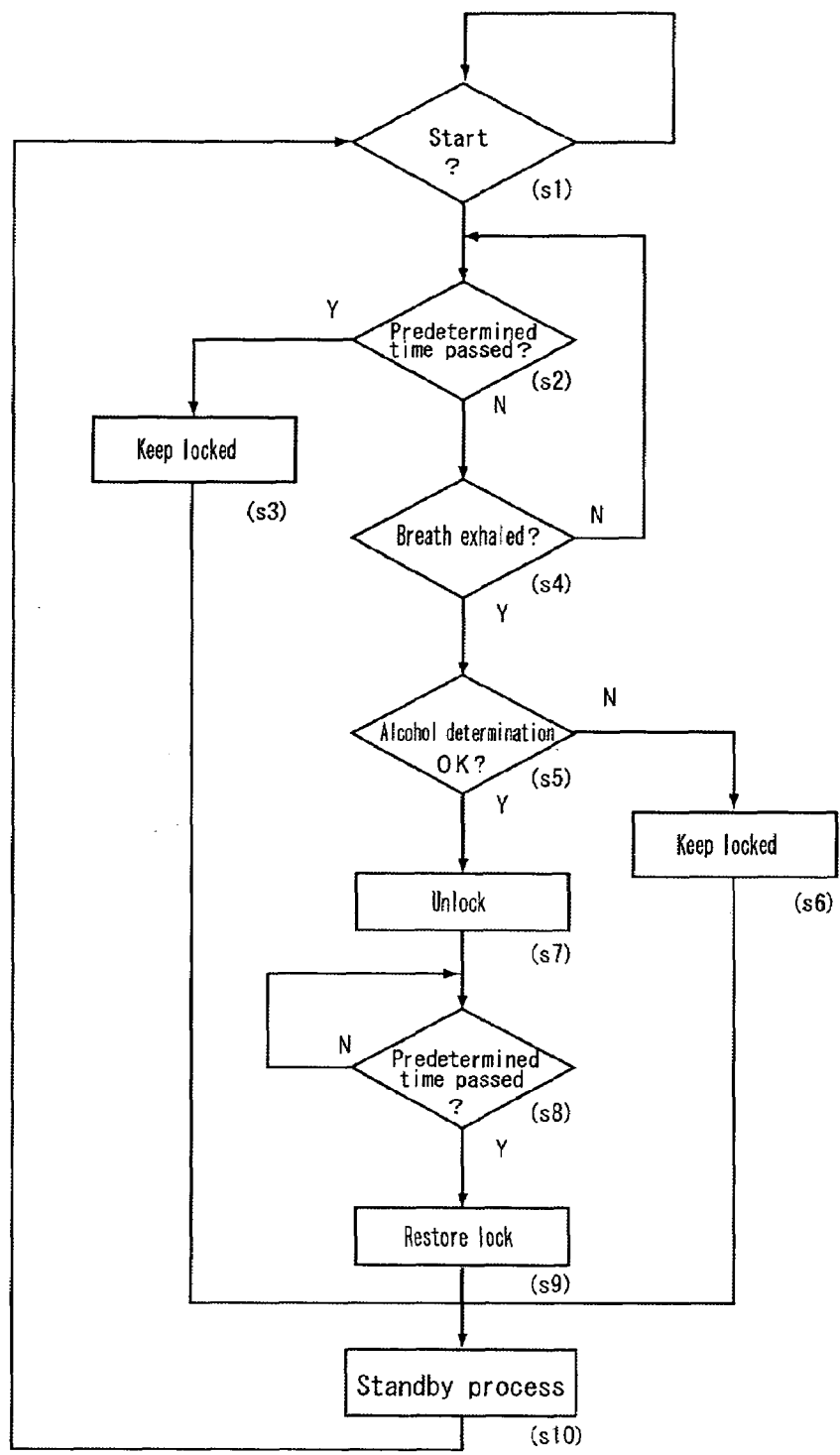
FIG. 7 is a flowchart of an alcohol concentration measurement program.

Next, the vehicle key according to a second embodiment of the invention is explained with reference to the drawings. FIG. 4 is a schematic diagram showing the vehicle key according to the second embodiment of the invention, in which (a) is a diagram showing one case, and (b) a diagram showing the other case. FIG. 5 is a schematic diagram showing the other case with the key projection member accommodated. FIG. 6 is a block diagram showing the same key, and FIG. 7 a flowchart of an alcohol concentration measurement program.

The vehicle key shown in FIG. 4 includes a key portion 100 that can be inserted into a key hole (not shown) of a vehicle such as a train, a motorbike or an automobile, and a holder portion 200 arranged on the base end portion 120 of the key portion 100. In this case, the forward end portion 110 of the key portion 100 makes up a main body of the key to be inserted into the key hole of the vehicle.

The holder portion 200 is configured as a two-piece structure including the cases 201, 202. The base end portion 120 of the key portion 100 is fixed by resin on the case 201. A mounting hole 210 for the key portion 100 is opened at one end surface of the case 201. The case 202, on the other hand, has built therein an insert prevention means, a breath component detection means 500, a start switch 700', a source battery not shown and a LED lamp not shown. At one end surface of the case 202, a through hole 220 from which the projection member 300 can be projected is opened. On the surface of the case 202, an intake hole (not shown) for the alcohol sensor 510 of the breath component detection means 500, a mounting hole (not shown) for exposing the start switch 700' and a mounting hole (not shown) for exposing the LED lamp are opened.

The case 202 contains therein, as shown in FIGS. 4, 5, a first guide portion 230 for guiding the projection member 300 of the insert prevention means linearly movably along the key portion 100, a second guide portion 240 arranged at a position perpendicular to one wall surface of the first guide portion 230, and a vertical wall 250 arranged at the rear end in the direction of movement of the first guide portion 230. The first guide portion 230 is formed as a pair of walls erected on the case 202. The portion of that one of the walls which is in opposed relation to the second guide portion 240 is partly cut. The second guide portion 240 is a cylindrical member having an upper opening for linearly movably guiding the plunger 620 of the lock mechanism 600 of the insert prevention means. One end portion of the second guide portion 240 is open, and communicates with the cut portion of the first guide portion 230. As a result, the plunger 620 can intrude into the first guide portion 230. Also, the bottom surface of the second guide portion 240 is formed with an opening (not shown) from which the protrusion 621 of the plunger 620 is projected. The vertical wall 250 holds the spring 400 of the insert prevention means with the rear end surface of the projection member 300. This spring 400 urges the projection member 300 in the direction of projection from the through hole 220.

The insert prevention means is configured of a projection member 300 projected along the key portion 100 from the holder portion 200, a spring 400 for urging the projection member 300 in the direction of projection, and a lock mechanism 600 for keeping the projection member 300 locked in a projected state in accordance with the detection result of the breath component detection means 500.

The projection member 300 is a bar-like member guided linearly movably by the first guide portion 230 of the case 202. The projection member 300 is adapted to be projected along the key portion 100 from the through hole 220 of the case 202 by the urging force of the spring 400. Also, the rear end portion of the projection member 300 is formed with a depression 301 adapted to engage the plunger 620.

The lock mechanism 600 includes a plunger 620 guided by the second guide portion 240 to linearly move from an engaging position for engaging the depression 301 of the projection member 300 to an evacuation position not engaging the depression 301 of the projection member 300, a spring 630 fitted in the second guide portion 240 to urge the plunger 620 toward the engaging position, a motor 610 (i.e. a drive means) for moving the plunger 620 from the engaging position to the evacuation position through a gear portion 650 in accordance with the detection result of the breath component detection means 500, and a position detection switch 640 that is turned on when the plunger 620 is located at the evacuation position.

The plunger 620 is a bar-like member having a protrusion 621, on the lower surface thereof, projected from the opening in the bottom surface of the second guide portion 240, and a contact unit 622 adapted to contact the position detection switch 640 on one transverse side surface.

The gear portion 650 includes gears 651 to 655 in mesh with each other to change the rotational motion of the head portion of the motor 610 to the linear motion of the plunger 620. The gear 651 is in mesh with the head of the motor 610. The gear 655 is arranged under the second guide portion 240 of the case 202 and has a cam portion 655a adapted to contact the protrusion 621 of the plunger 620. The gears 652 to 654 are in mesh with each other between the gears 651 and 655. Specifically, with the rotation of the motor 610, the cam portion 655a of the gear 655 is rotated through the gears 651 to 654. This cam portion 655a comes into contact with and presses the protrusion 621 of the plunger 620, so that the plunger 620 is moved to the evacuation position from the engaging position against the urging force of the spring 630.

The position detection switch 640 is arranged at such a position as to come into contact with the contact portion 622 of the plunger 620 when evacuated to the evacuation position. This position detection switch 640, once contacted by the contact portion 622 of the plunger 620, turns on and outputs the output signal toward the control unit 520 of the breath component detection means 500.

The breath component detection means 500, as shown in FIG. 6, includes an alcohol sensor 510 and a control unit 520 for controlling the on/off operation of the motor 610 in accordance with the output signal of the alcohol sensor 510.

The alcohol sensor 510 is a well-known semiconductor gas sensor adapted so that when the breath is exhaled thereon for a predetermined time (about 2 seconds), the internal resistance of the sensor changes and this change in the internal resistance is output as an output signal. Specifically, in the case where alcohol is contained in the breath, the alcohol is attached to the catalyst in the alcohol sensor 510 and the internal resistance thereof undergoes a great change. By heating up the sensor, the alcohol attached to the catalyst is burned and evaporated.

The control unit 520 is a microcomputer. The input port of the control unit 520 is connected with the alcohol sensor 510, the position detection switch 640 and the start switch 700', while the output port thereof is connected with the motor 610 and the LED lamp. The alcohol concentration of 0.14 mg/L in the breath is stored as a reference value in the memory of the control unit 520.

Specifically, the control unit 520 has the function to measure the alcohol concentration in the breath of the user based on the output signal of the alcohol sensor 510, compare the measurement value with the reference value, and in the case where the result of comparison shows that the measurement value is not less than the reference value, drive the motor 610.

Further, the alcohol concentration measurement program (FIG. 7) is stored in the memory. The control unit 520 implements the aforementioned function by executing the program. The control unit 520 has a timer circuit built therein.

The alcohol concentration measurement program executed by the control unit 520 is specially described in detail below, together with the operation of the various parts of the vehicle key and the method of using them.

First, in standby mode, it is determined whether the start switch 700' is held down or not (s1). At this time, the projection member 300 is energized by the spring 400 while being locked by the lock mechanism 600 (i.e. locked as the plunger 620 urged by the spring 630 engages the depression 301 of the projection member 300). In this way, the projection member 300 is kept projected. In an attempt to insert the key portion 100 into the key hole of the vehicle, therefore, the forward end of the projection member 300 comes into contact with the edge of the key hole with the result that only a part of the forward end portion 110 of the key portion 100 can be inserted into the key hole.

Upon holding down of the start switch 700' at step 1, the control unit 520 activates the timer circuit and turns on the alcohol sensor 510, which then begins to make preparations (heat up). Upon completion of the heat-up operation, the green LED lamp is turned on indicating that the preparation is done.

After that, it is determined with reference to the count on the timer circuit whether a predetermined time (6 seconds in this case) has passed after holding down of the start switch 700' or not (s2). In the case where the determination result shows that the predetermined time has passed, the motor 610 is kept in the off state, while the lock mechanism 600 remains locked (s3). At the same time, the red LED lamp is turned on for five seconds. Then, after executing the standby process at step 10, the process returns to step 1. In the case where the determination is that the predetermined time has yet to be passed, on the other hand, it is determined whether the output signal of the alcohol sensor 510 is input or not (i.e. whether the breath is exhaled on the alcohol sensor 510 or not) (s4).

Upon determination that no breath has been exhaled, the process returns to step 2. Upon determination that the output signal is input and the breath has been exhaled, on the other hand, the alcohol concentration in the breath of the user is measured based on the output signal of the alcohol sensor 510.

After that, this measurement value is compared with the reference value on the memory thereby to determine whether the measurement value is not less than the reference value (i.e. whether the alcohol not less than the reference value is contained in the breath of the user or not) (s5). Upon determination that the measurement value is not less than the reference value (i.e. the alcohol not less than the reference value is contained in the breath of the user), the motor 610 is kept in the off state and the lock mechanism remains locked (s6). At the same time, the red LED lamp is turned on for 30 seconds. Then, after the standby process is performed at step 10, the process returns to step 1. Upon determination that the measurement value is less than the reference value, on the other hand, the green LED lamp is turned on and the motor 610 is driven. Then, the gears 651 to 655 rotate, whereby the cam portion 655a of the gear 655 comes into contact with and presses the protrusion 621 of the plunger 620. As a result, the plunger 620 moves from the engaging position to the evacuation position against the urging force of the spring 630. Once the plunger 620 is located at the evacuation position, the position detection switch 640 turns on and outputs an output signal. Upon input of this output signal, the motor 610 is stopped driving and the timer circuit is activated. In this way, the lock mechanism 600 is unlocked (s7).

Once the lock mechanism 600 is unlocked in the above manner, the user now can insert the key portion 100 in its entirety into the key hole of the vehicle (FIG. 5). After the key portion 100 is inserted into the key hole, the forward end portion of the projection member 300 in projected state comes into contact with the edge of the key hole, and the projection member 300 is accommodated in the holder portion 200 against the urging force of the spring 400. As a result, the whole forward end portion 110 of the key portion 100 can be inserted into the key hole and therefore the prime mover of the vehicle can be started.

After that, with reference to the count value on the timer circuit, it is determined whether a predetermined time (30 seconds in this case) has passed after the lock mechanism is unlocked (s8). Upon determination that the predetermined time has yet to be passed, the process is repeated. Upon determination that the predetermined time has passed, on the other hand, the green LED lamp is turned off and the motor 610 is started. Then, the gears 651 to 655 rotate whereby the cam portion 655a of the gear 655 ceases to be in contact with the protrusion 621 of the plunger 620. Then, the plunger 620 is moved linearly from the evacuation position by the urging force of the spring 630, and the position detection switch 640 is turned off. Once the output signal ceases to be input with the turning off of the position detection switch 640, the motor 610 stops being driven. As a result, the lock mechanism 600 is put into a state in which the lock can be restored (s9).

In the case where the key portion 100 is not inserted into the key hole at step 9, the plunger 620 is fitted in the depression 301 of the projection member 300, and lock of the lock mechanism 600 is restored. In the case where the forward end portion 110 of the key portion 100 is inserted in the key hole, on the other hand, the projection member 300 is accommodated in the holder portion 200 and therefore the plunger 620 fails to engage the depression 301 of the projection member 300 but comes in contact with the side surface thereof. After that, when the key portion 100 is pulled off from the key hole, the projection member 300 is moved by the force of the spring 400 in the direction of projection from the holder portion 200. In the process, the plunger 620 is fitted in the depression 301 of the projection member 300, thereby the lock of the lock mechanism 600.

After that, the standby process is executed such as turning off of the LED lamp and the alcohol sensor 510 (s10), and the process is returned to step 1.

With this vehicle key, in the case where the alcohol concentration in the breath of the user is less than the reference value, the projection member 300 is unlocked, and therefore while the projection member 300 is pushed in the holder portion 200 against the urging force of the spring 400, the whole forward end portion 110 of the key portion 100 can be inserted into the key hole of the vehicle. In the case where the alcohol concentration in the breath of the user is not less than the reference value, on the other hand, the projection member 100 is not unlocked and kept projected along the key portion 100. Therefore, the whole forward end portion 110 of the key portion 100 cannot be inserted in the key hole of the vehicle, and therefore the prime mover of the vehicle cannot be started. Thus, the drunken driving can be prevented effectively.

The vehicle key according to the first and second embodiments described above is used for starting the prime mover of a vehicle by inserting it into the key hole of the vehicle such as a train, a motorbike or an automobile. This vehicle key comprises a key portion with the forward end portion thereof capable of being inserted into the key hole of the vehicle, a holder portion arranged at the base end portion of the key portion, an insert prevention means projected from the holder portion thereby to prevent the key portion from being inserted into the key hole of the vehicle, and a breath component detection means for detecting the alcohol contained in the breath of the user. The insert prevention means can changed in design in any way as long as it is so configured as to be accommodable in the holder portion in accordance with the detection result of the breath component detection means.

The projection member 300 can be in any shape as long as it is projected from the holder portion 200 and can prevent the forward end portion 110 of the key portion 100 from being inserted into the key hole. Therefore, the projection member 300 can be arranged on the key portion 100. For example, a through hole is formed in the key portion 100 in the lengthwise direction, and the bar-like projection member 300 is inserted into this through hole in such a manner as to be projected from the forward end of the forward end portion 110 of the key portion 100.

The lock mechanism 600, which is explained above as a means using a solenoid or a motor, as an example, may alternatively be in any form as long as a similar function can be implemented.

The breath component detection means 500 described above includes the alcohol sensor 510 and the control unit 520, and may alternatively be in any form as far as a similar function can be implemented. The reference value stored in the memory of the control unit 520 is illustrative, and can be set to any arbitrary value. Also, a configuration may be employed in which the lock mechanism 600 is prevented from being unlocked, without setting a reference value, upon detection of even a slight amount of alcohol by the alcohol sensor 510.

The power switch 700 and the start switch 700' may or may not be provided. In such a case, the alcohol sensor 510 is required to be always kept in the on state. The power switch 700 and the start switch 700' of any type can of course be employed.

Third Embodiment

Figure 8:
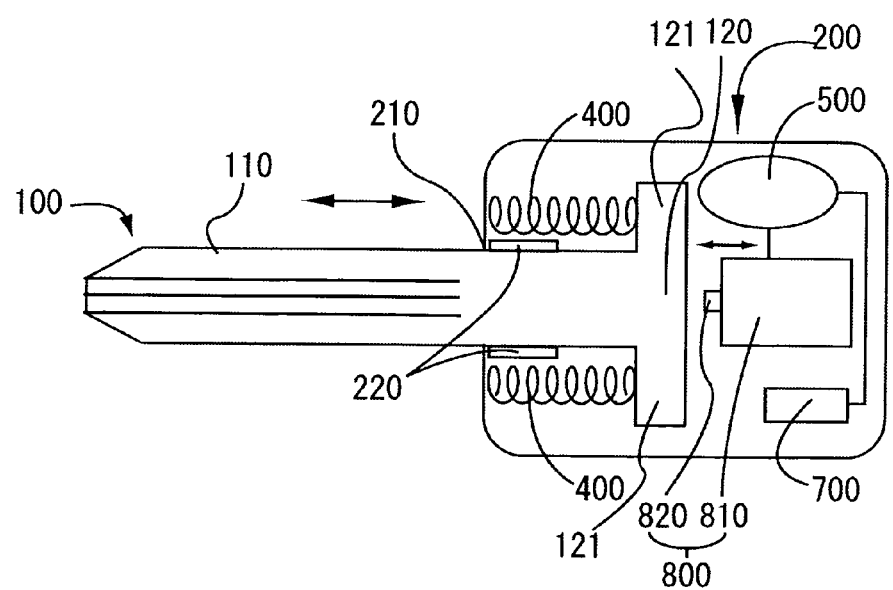
FIG. 8 is a see-through schematic front view of the holder portion of the vehicle key according to a third embodiment of the invention.
Figure 8:
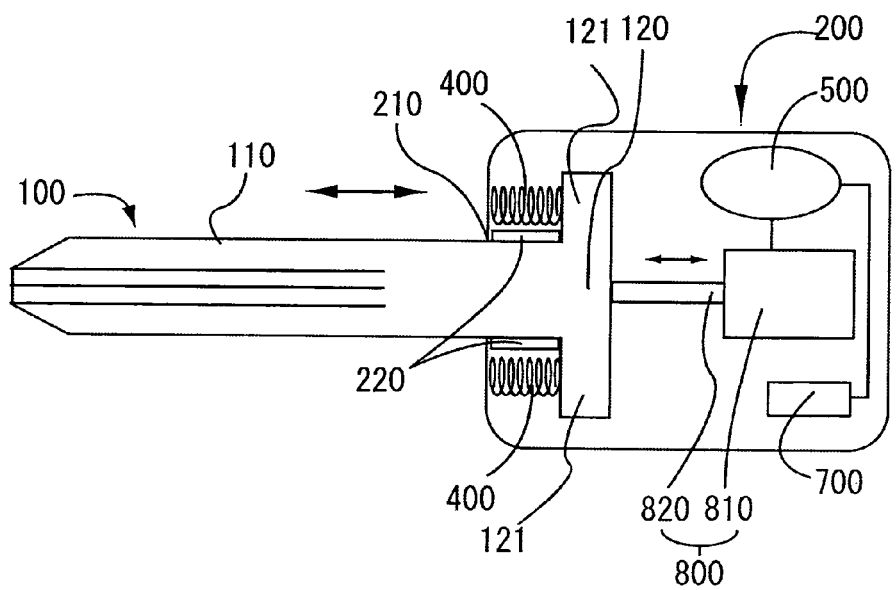

Next, a vehicle key according to a third embodiment of the invention is explained with reference to the drawings. FIG. 8 is a schematic front view showing the vehicle key according to the third embodiment of the invention including the holder portion in perspective, FIG. 9 a circuit diagram of the same key, and FIG. 10 a flowchart of an alcohol concentration measurement program.

The vehicle key shown in FIG. 8 includes a key portion 100 with the forward end portion 110 thereof insertable in the key hole (not shown) of a vehicle such as a train, a motorbike or an automobile and a holder portion for holding the base end portion 120 of the key portion 100 slidably and capable of accommodating at least a part of the forward end portion 110 of the key portion 100. The component parts identical to those of the vehicle key according to the first embodiment are not described.

The key portion 100, which is substantially similar to the key portion 100 of the first embodiment, is different in that protrusions 121, 121 are formed on both sides of the base end portion 120.

The holder portion 200 is a rectangular case substantially similar to that of the first embodiment, and different in that it additionally includes guides 220, 220 as ridges for holding the base end portion 120 of the key portion 100 slidably. Also, the holder portion 200, like in the first embodiment, is formed with a mounting hole 210 for the key portion 100, an intake hole (not shown) in opposed relation to the alcohol sensor 510 of the breath component detection means 500, and a mounting hole (not shown) of the power switch 700.

The holder portion 200 has built therein springs 400, 400 for energizing the key portion 100 in the direction of accommodation and setting the forward end portion 110 thereof in a state incapable of being inserted into the key hole, a breath component detection means 500 for detecting the alcohol contained in the breath of the user, a pressure mechanism 800 for projecting the key portion 100 in such a manner as to be insertable into the key hole against the urging force of the spring 400 in accordance with the output signal of the breach component detection means 500, and a power switch 700 and a source battery not shown.

The springs 400, 400 are coil springs, which are interposed between the protrusions 121, 121 of the base end portion 120 of the key portion 100 and the inside of one end surface of the holder portion 200 thereby to urge the key portion 100 in the direction of being accommodated in the holder portion 200.

The pressure mechanism 800 includes a solenoid 810 excited in accordance with the detection result of the breath component detection means 500 and a plunger 820 coupled to the solenoid 810 to press the base end portion 120 of the key portion 11 in the direction of being projected. Specifically, as shown in FIG. 8(a), the plunger 820 is evacuated while the solenoid 810 is not excited, and a part of the forward end portion 110 of the key portion 100 is accommodated in the holder portion 200. Upon excitation of the solenoid 810 in accordance with the detection result of the breath component detection means 500, on the other hand, as shown in FIG. 8(b), the plunger 820 is projected and the base end portion 120 of the key portion 100 is pressed thereby to keep the whole forward end portion 110 of the key portion 100 in a projected state capable of being inserted into the key hole.

The power switch 700 is identical to the corresponding one in the first embodiment.

Figure 9:
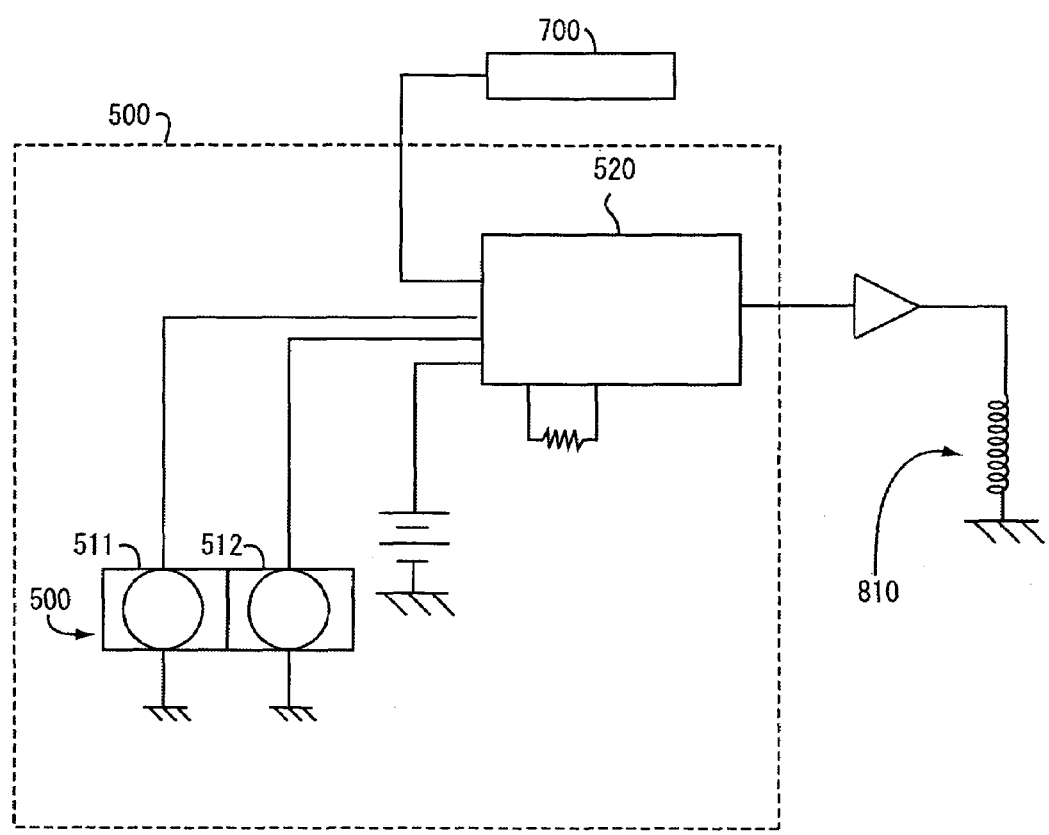
FIG. 9 is a circuit diagram of the same key.
Figure 10:
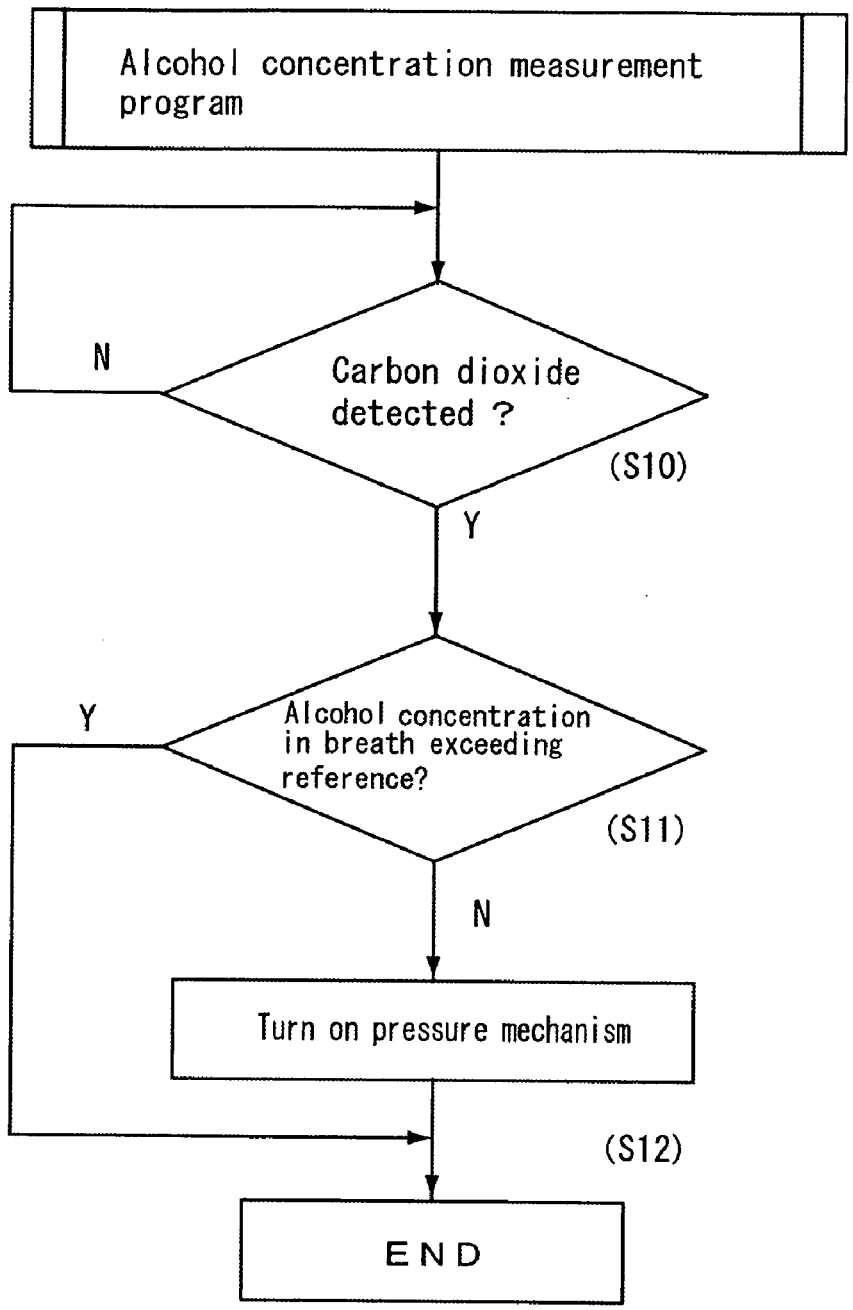
FIG. 10 is a flowchart of an alcohol concentration measurement program.

The breath component detection means 500, as shown in FIG. 9, includes an alcohol sensor 510, and a control unit 520 for controlling the excitation of the solenoid 810 in accordance with the output signal of the alcohol sensor 510. The alcohol sensor 510 is identical to the corresponding one used in the first embodiment.

The control unit 520, like in the first embodiment, is a one-chip microcomputer. The control unit 520 is connected with the solenoid 810.

As a result, the control unit 520, based on the output signal of the second gas sensor 512, detects the carbon dioxide in the breath of the user and determines whether the user exhaled or not. At the same time, the control unit 520 has the function to measure the alcohol concentration in the breath of the user based on the output signal of the first gas sensor 511, compare the measurement value with the reference value, and in the case where the measurement value exceeds the reference value, excite the solenoid 810.

Figure 3:
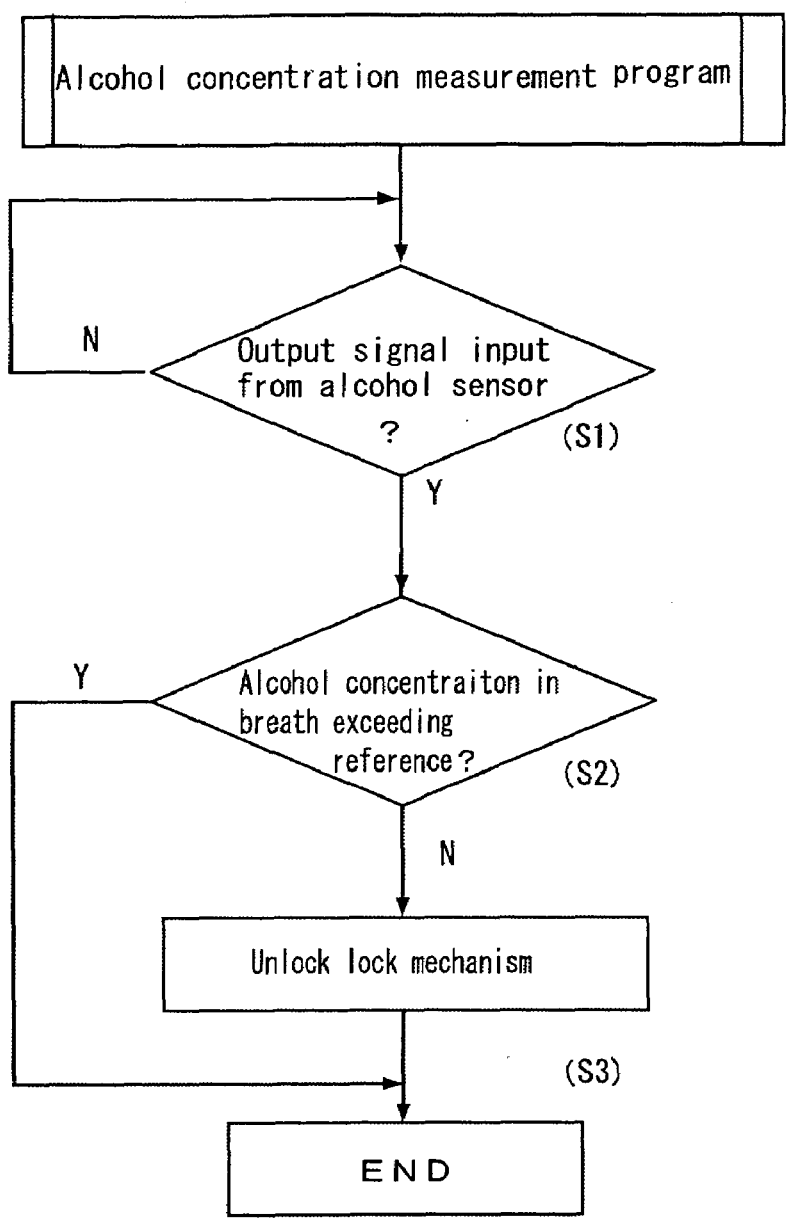
FIG. 3 is a flowchart of an alcohol concentration measurement program.

Also, the memory has stored therein, in place of the alcohol concentration measurement program shown in FIG. 3, an alcohol concentration measurement program (FIG. 10) executed by holding down 700. The control unit 520 implements the aforementioned function by executing this program.

The control unit 520 has built therein a timer circuit, which is set to turn off upon lapse of a predetermined time after holding down 700.

The operation of each part of the vehicle key having this configuration is explained below, together with the method of operation thereof.

First, in the off state, the key portion 100 is urged by the springs 400, 400 so that a part of the forward end portion 110 of the key portion 100 is kept accommodated in the holder portion 200. In an attempt to insert the forward end portion 110 of the key portion 100 into the key hole of the vehicle, therefore, the forward end portion 110 of the key portion 100 cannot be inserted in its entirety into the key hole.

The user trying to ride the vehicle holds down the power switch 700. Then, the control unit 520 executes the alcohol concentration measurement program shown in FIG. 10 and starts the timer circuit at the same time.

After that, based on the output signal of the second gas sensor 512, it is determined whether the carbon dioxide has been detected not (S10). Specifically, it is determined whether the user has exhaled on the alcohol sensor 510 of the holder portion 200.

Upon determination that the breath is not exhaled, the process of step 10 is repeated, while in the case where it is determined that the breath has been exhaled, the alcohol concentration in the breath of the user is measured based on the output signal of the first gas sensor 511, thereby determining whether the alcohol concentration is not less than a reference value or not (S11)

As a result, upon determination that the alcohol concentration is not more than the reference value, the solenoid 810 is energized and the plunger 820 is caused to press the key portion 100, whereby the whole of the forward end portion 110 of the key portion 100 is kept projected in the form insertable into the key hole (S12). After that the process of this program is terminated.

As long as the whole of the forward end portion 110 of the key portion 100 is kept projected, the key portion 100 can be inserted into the key hole by the user, and therefore the prime mover of the vehicle can be started.

Upon determination, at step 11, that the alcohol concentration is not less than the reference value, on the other hand, the program execution is terminated. Specifically, the solenoid 810 is kept deenergized and a part of the forward end portion 110 of the key portion 100 is kept accommodated in the holder portion 200, and therefore the user cannot start the prime mover of the vehicle.

The timer circuit is turned on during the process of steps 10 to 12, and upon lapse of a predetermined time, the operation is turned into the off state. Specifically, upon lapse of the predetermined time after holding down the power switch 700 without exhaling the breath on the alcohol sensor 510, the operation is turned into the off state. The operation is also turned off the predetermined time has lapsed after being pressed by the plunger 820 at step 12 to put the projection of the whole forward end portion 110 of the key portion 100 in the state insertable into the key hole. Then, the solenoid 810 ceases to be excited, the plunger 820 is evacuated, and a part of the forward end portion 110 of the key portion 100 is accommodated in the holder portion 200. In this way, the alcohol is measured immediately before the driving operation. By turning off the operation upon lapse of the predetermined time as described above, it is possible to save the power.

In the case where the key portion 100 is inserted in the key hole (i.e. in driving operation), the operation is turned into the off state upon lapse of the predetermined time as described above. In this process, the solenoid 810 is not excited. Although the plunger 820 attempts to be evacuated, the forward end portion 110 of the key portion 100 is held in the key hole, and therefore a part of the forward end portion 110 of the key portion 100 fails to be accommodated in the holder portion 200.

When the key is pulled off from the key hole after the driving is over, the key portion 100 is energized by the springs 400, 400, thereby a part of the forward end portion 110 of the key portion 100 is accommodated in the holder portion 200.

With this vehicle key, in the case where the alcohol concentration in the breath of the user is not more than the reference value, the solenoid 810 is excited, and the plunger 820 presses the base and portion 120 of the key portion 100 against the urging force of the springs 400, 400, and the whole of the forward end portion 110 of the key portion 100 is projected and adapted to be inserted into the key hole of the vehicle. In the case where the alcohol concentration in the breath of the user is not less than the reference value, on the other hand, the solenoid 810 is excited, the plunger 820 is evacuated, and a part of the forward end portion 110 of the key portion 100 is kept accommodated in the holder portion 200. Therefore, the whole of the forward end portion 110 of the key portion 100 cannot be inserted into the key hole of the vehicle, and the prime mover of the vehicle cannot be started. Thus, the drunken driving can be prevented effectively.

The vehicle key according to the third embodiment described above is inserted into the key hole of the vehicle such as a train, a motorbike or an automobile and used for starting the prime mover of the vehicle. This vehicle key can be changed in design in any way, as long as it includes a key portion with the forward portion thereof inserted into the key hole of a vehicle such as a train, a motorbike or an automobile, a holder portion for holding the base end portion of the key portion slidably and capable of accommodating at least a part of the forward end portion of the key portion, a retaining means for keeping the key portion accommodated in the holder portion, a breath component detection means for detecting the alcohol contained in the breath of the user, and a projection means for projecting the whole forward end portion of the key portion in such a manner as to be insertable into the key hole in accordance with the detection result of the breath component detection means.

The pressure mechanism 800 includes the plunger 820 for pressing the key portion 100 and the solenoid 810 for linearly moving the plunger 820 as described above. As long as a similar function can be realized, however, any configuration may be used. For example, the plunger 820 may be linearly moved by use of a motor or the like.

The spring 400 may or may not be included. In other words, it is sufficient when at least the key portion 100 is arranged slidably on the holder 200. In this case, the key portion 100 is required to be arranged on the holder in such a manner that the key portion 100 is accommodated in the holder portion 200 under the pressure generated at the time of inserting the key portion 100 into the key holder.

The breath component detection means 500 includes the alcohol sensor 510 and the control unit 520 as described above. Nevertheless, any configuration capable of exhibiting a similar function can alternatively be employed. The reference value stored in the memory of the control unit 520 is illustrative, and can be set to any arbitrary value. Also, instead of setting the reference value, a configuration may be employed in which the pressure mechanism 800 is not activated upon detection of even a slight amount of alcohol by the alcohol sensor 510.

The power switch 700 and the start switch 700' may or may not be included. In this case, the alcohol sensor 510 required to be always kept in the on state. The power switch 700 and the start switch 700' of any type can of course be employed.

Fourth Embodiment

Figure 11:
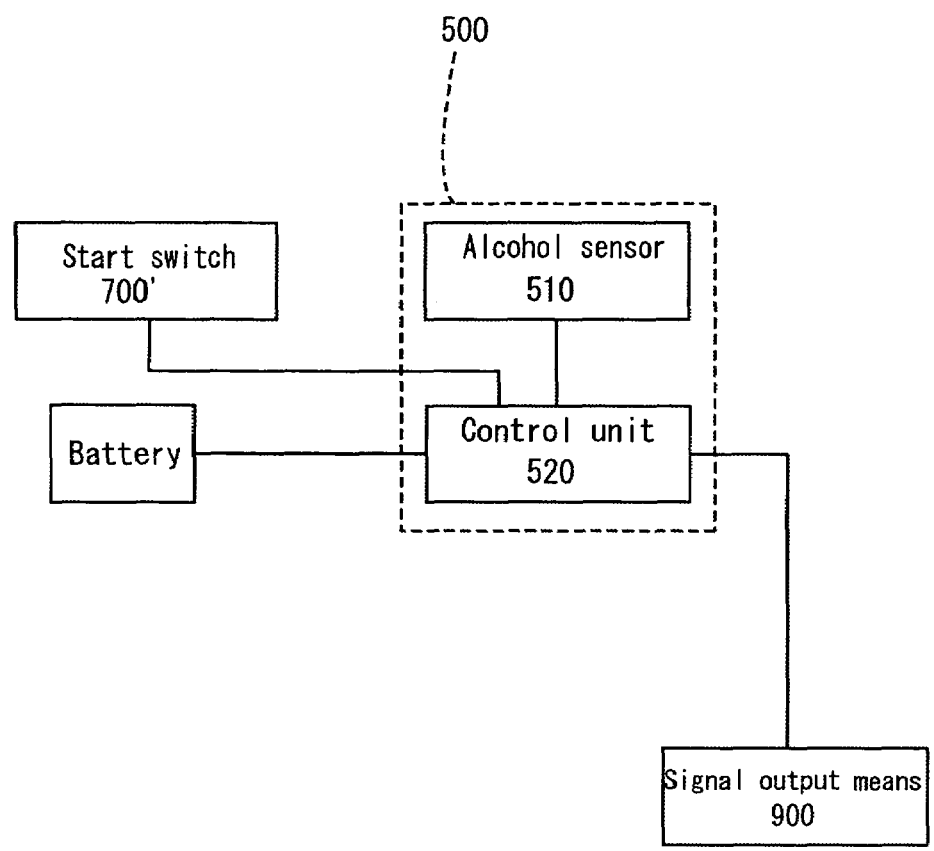
FIG. 11 is a block diagram of the vehicle key according to a fourth embodiment of the invention.

The vehicle key according to a fourth embodiment of the invention is explained below with reference to the drawings. FIG. 11 is a block diagram of the vehicle key according to the fourth embodiment of the invention, and FIG. 12 a flowchart for the alcohol concentration measurement program.

The vehicle key shown in FIG. 11 is for starting the prime mover of the vehicle such as a train, a motorbike or an automobile by outputting the start permit signal to the vehicle. The vehicle key comprises a signal output means 900 for outputting the start permit signal, a breath component detection means 500 for detecting the alcohol contained in the breath of the user, and a prevention means for preventing the signal output means from outputting the start permit signal to the vehicle in accordance with the detection result of the breath component detection means.

The signal output means 900 is a device for outputting the start permit signal in such a form as a radio wave or infrared light to an antenna or a receiving port of the vehicle. An immobilizer is an example.

The start switch 700' used in this embodiment is the same as that of the second embodiment.

The breath component detection means 500 is configured of an alcohol sensor 510, and a control unit 520 for controlling the on/off operation of the signal output means 900 in accordance with the output signal of the alcohol sensor 510. The control unit 520 functions as a prevention means. The alcohol sensor 510 is identical to that of the second embodiment.

The control unit 520 is formed of a one-chip microcomputer having an input port connected with the alcohol sensor 510 and the start switch 700' and an output port with the alcohol sensor 510 and the signal output means 900. The memory of the control unit 520 has stored therein a reference value similar to that of the first and second embodiments.

Specifically, the control unit 520 has the function to measure the alcohol concentration in the breath of the user based on the output signal of the alcohol sensor 510, compare the measurement value with the reference value, and in the case where the result shows that the measurement value exceeds the reference value, turns off the signal output means 900.

Figure 12:
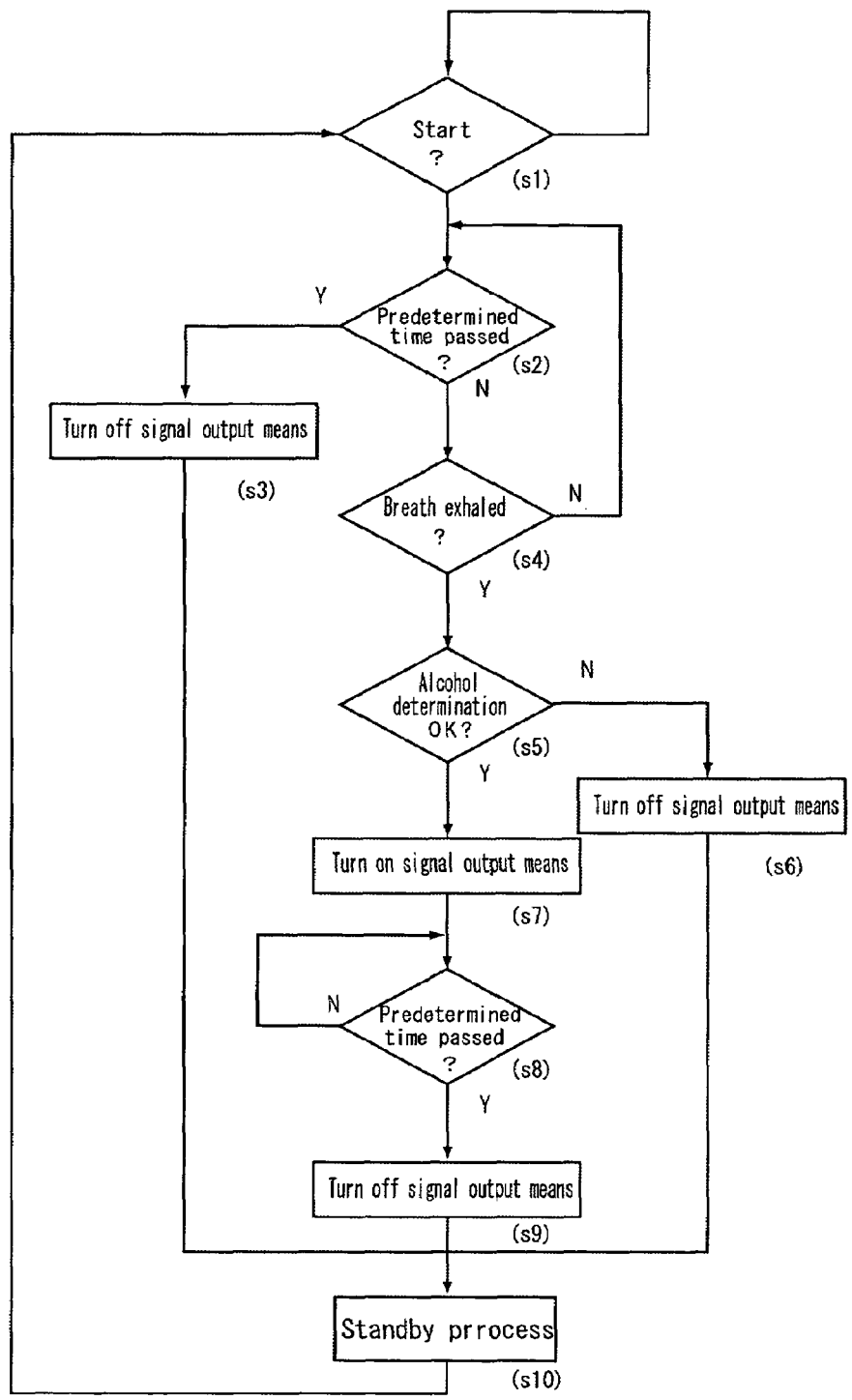
FIG. 12 is a flowchart of an alcohol concentration measurement program.

Also, the memory has stored therein the alcohol concentration measurement program shown in FIG. 12. The control unit 520 can exhibit the aforementioned function by executing the alcohol concentration measurement program. The control unit 520 has a timer circuit built therein.

The operation of the control unit 520 of the vehicle key having this configuration is explained below, together with the method of operation thereof.

In the standby mode, it is determined whether the start switch 700' is held down or not (s1). At this time, the signal output means 900 is in the off state. Thus, the prime mover of the vehicle cannot not be started.

Upon holding down of the start switch 700' at step 1, the control unit 520 activates the timer circuit. The alcohol sensor 510 is turned on to begin the preparation (heat-up) for operation. Upon completion of the heat-up, the green LED lamp is turned on indicating that the preparation is done.

After that, with reference to the count on the timer circuit, it is determined whether a predetermined time (6 seconds in this case) has passed or not after holding down the start switch 700' (s2). In the case where the determination result shows that the predetermined time has passed, the signal output means 900 is kept in the off state (s3). At the same time, the red LED lamp is turned on for five seconds. Then, after executing the standby process at step 10, the process returns to step 1. Upon determination that the predetermined time has yet to be passed, on the other hand, it is determined whether the output signal of the alcohol sensor 510 is input or not (i.e. the breath is exhaled on the alcohol sensor 510 or not) (s4).

Upon determination that no breath has been exhaled, the process returns to step 2. Upon determination that the output signal is input and the breath has been exhaled, on the other hand, the alcohol concentration in the breath of the user is measured based on the output signal of the alcohol sensor 510.

After that, the measurement value is compared with the reference value on the memory thereby to determine whether the measurement value is not less than the reference value or not (i.e. whether the alcohol not less than the reference value is contained in the breath of the user or not) (s5). Upon determination that the measurement value is not less than the reference value (i.e. that the alcohol not less than the reference value is contained in the breath of the user), the signal output means 900 is kept in the off state (s6). Then, after the standby process is performed at step 10, the process returns to step 1. Upon determination that the measurement value is less than the reference value, on the other hand, the green LED lamp is turned on, and the signal output means 900 is turned on. As a result, the start permit signal is output from the signal output means 900 to the vehicle, so that the prime mover of the vehicle can be started.

After that, with reference to the count value on the timer circuit, it is determined whether a predetermined time (30 seconds in this case) has passed or not after the turning on of the signal output means 900 (s8). Upon determination that the predetermined time has yet to pass, the same process is repeated. Upon determination that the predetermined time has passed, on the other hand, the green LED lamp is turned off, and the signal output means 900 is turned off at the same time (s9).

After that, the standby process such as turning off of the LED lamp and the alcohol sensor 510 is executed (s10), and the process returns to step 1.

With this vehicle key, in the case where the alcohol concentration in the breath of the user is not more than the reference value, the signal output means 900 is turned into the on state. In the case where the alcohol concentration in the breath of the user is not less than the reference value, on the other hand, the signal output means 900 is turned into the off state. Thus, the user cannot start the prime mover of the vehicle. In this way, the drunken driving is effectively prevented.

Fifth Embodiment

Figure 13:
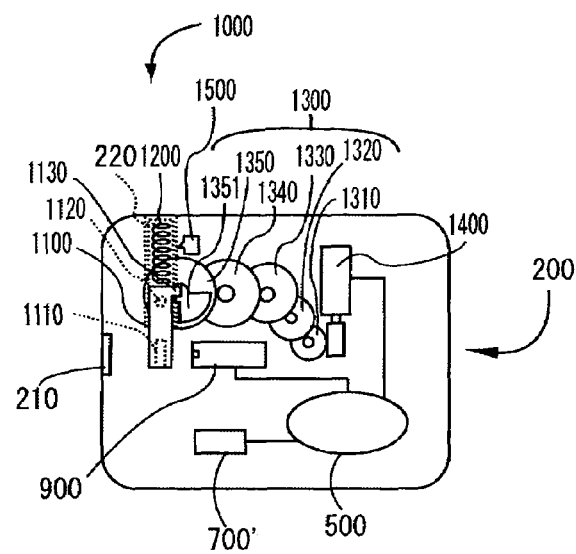
FIGS. 13(a) to (b) are Schematic diagrams of the vehicle key according to a fifth embodiment of the invention, in which (a) shows the signal of the signal output means being shielded, and (b) the signal of the signal output means being not shielded.
Figure 13:
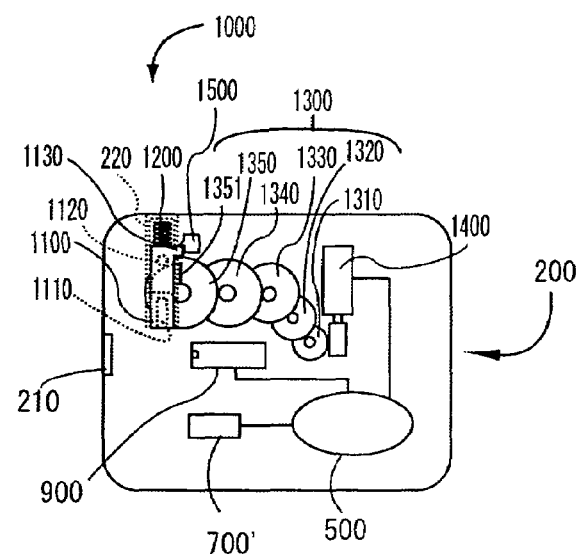
Figure 14:
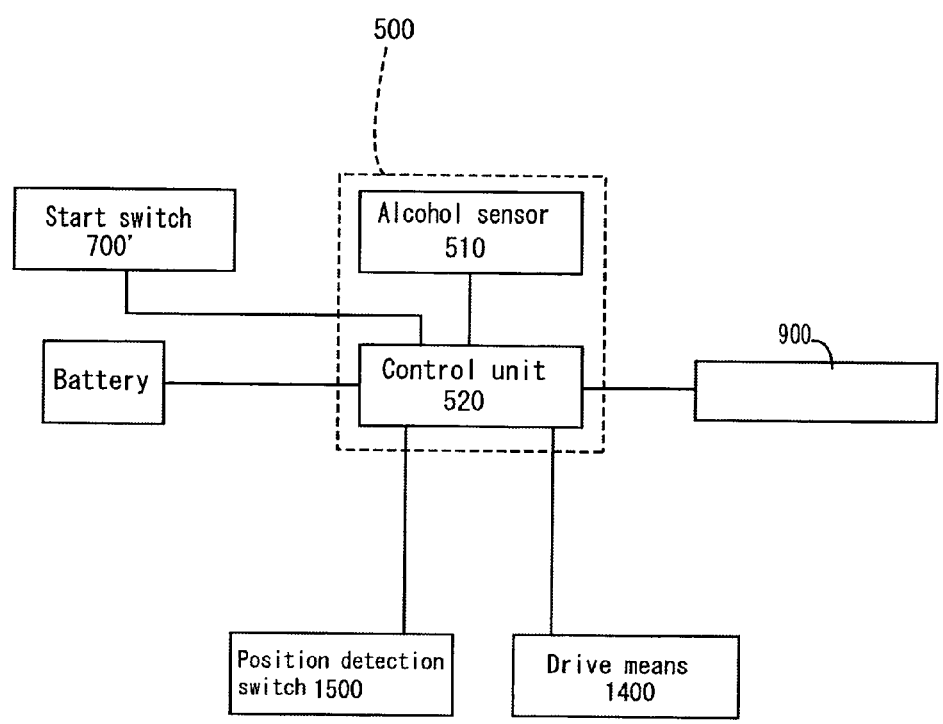
FIG. 14 is a block diagram of the same key.
Figure 15:
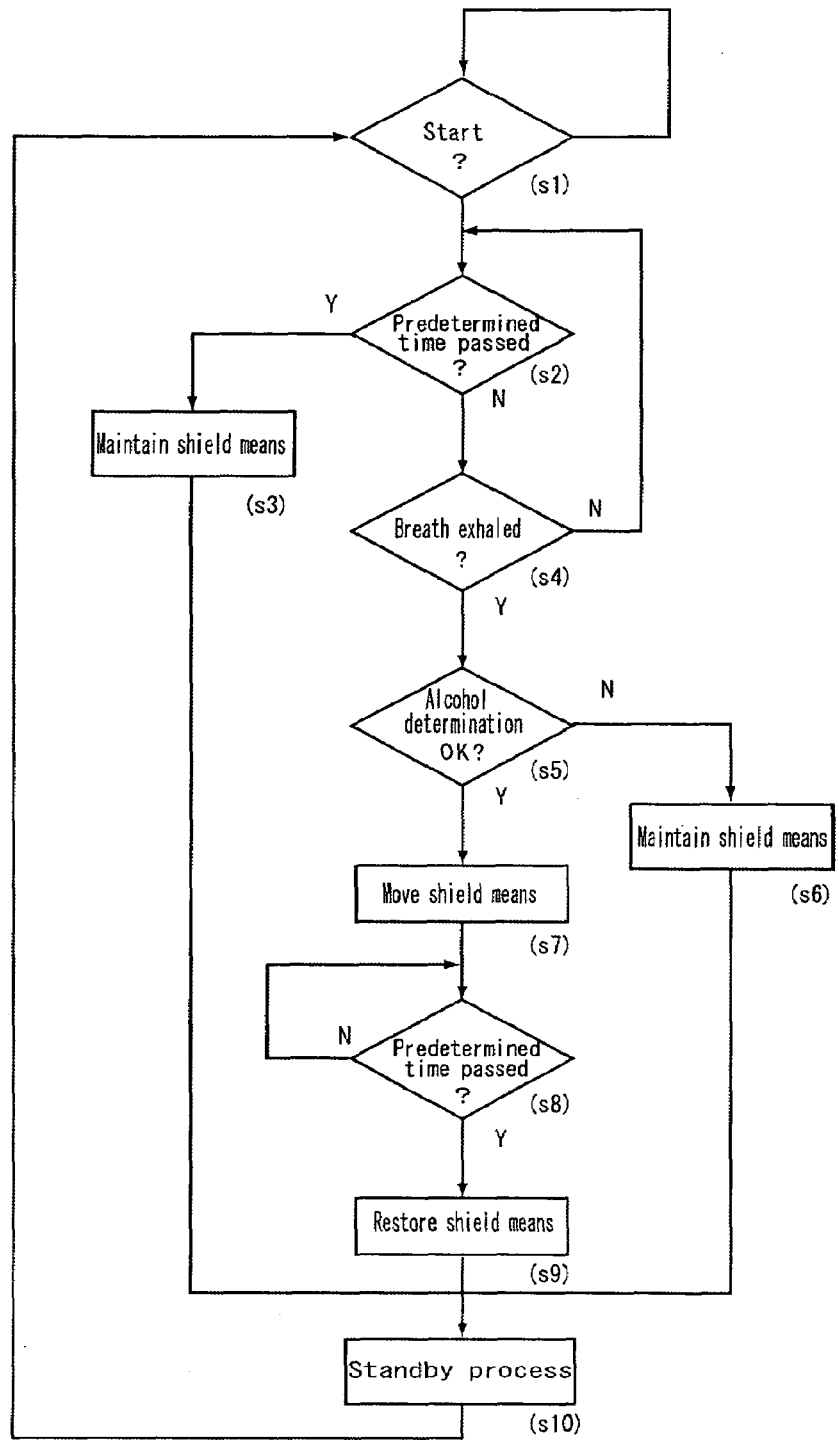
FIG. 15 is a flowchart of an alcohol concentration measurement program.
Figure 16A:
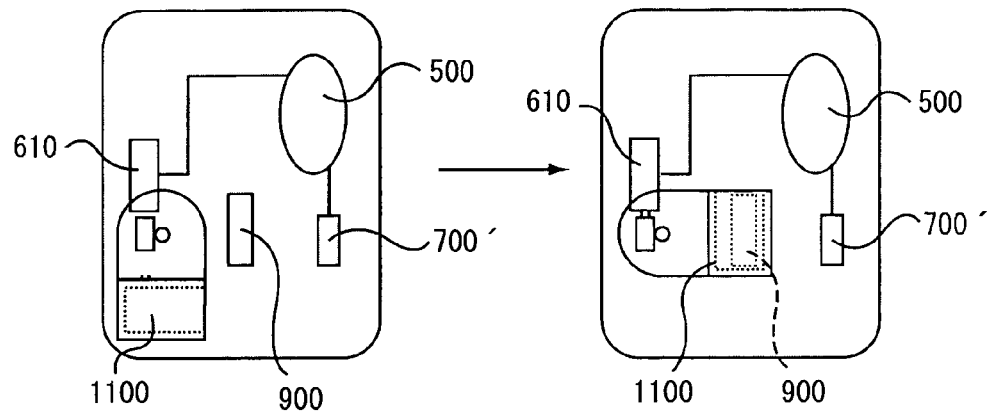
FIGS. 16(a) to (c) are Diagrams showing an example of design change of the key shield circuit, in which (a) is a diagram showing the shield means rotated in accordance with the drive of the motor, (b) a diagram showing a shield means adapted to move along the lengthwise direction of the holder portion in accordance with the drive of the motor, and (c) the shield means for covering the signal output means in accordance with the drive of the motor.
Figure 16B:
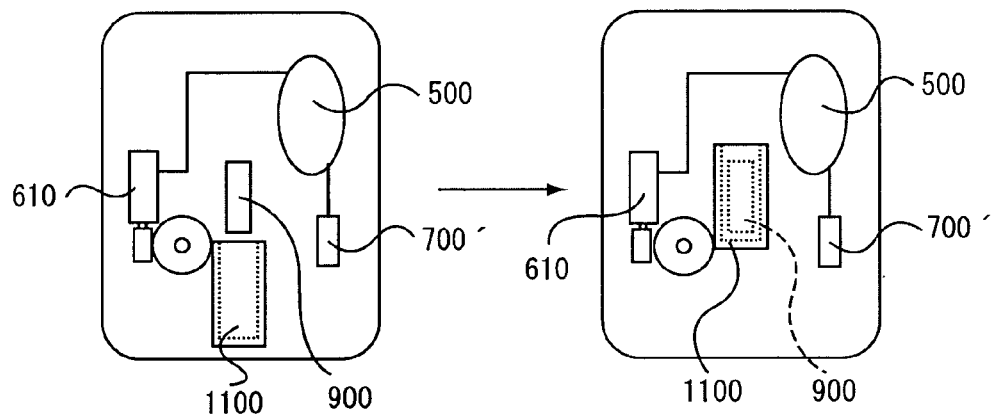
Figure 16C:
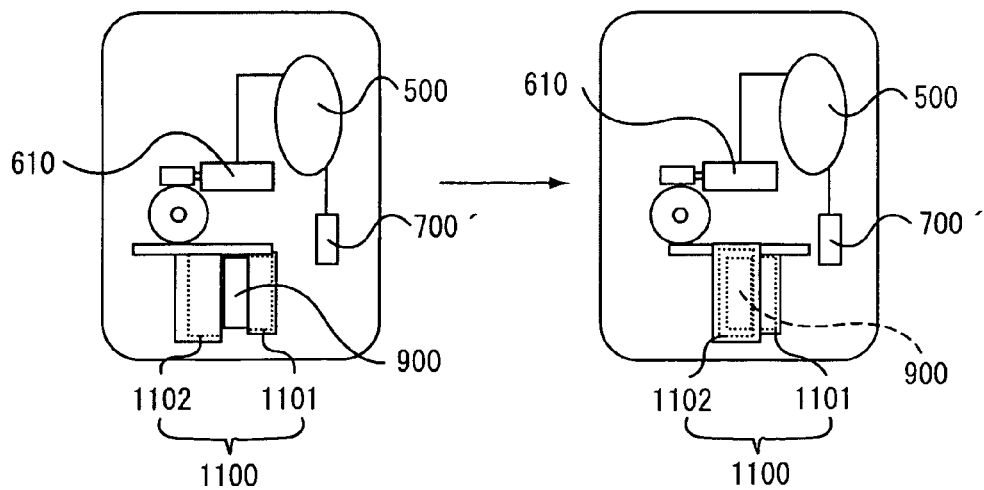

The vehicle key according to a fifth embodiment of the invention is explained below with reference to the drawings. FIG. 13 is a schematic diagram showing a vehicle key according to the fifth embodiment of the invention, in which (a) is a diagram showing the state in which the signal of the signal output means is shielded, and (b) is a diagram showing the state in which the start permit signal of the signal output means is not shielded. FIG. 14 is a block diagram of the same key. FIG. 15 is a flowchart of the alcohol concentration measurement program. FIG. 16 is a diagram showing an example of design change of the shield means of the same key, in which (a) is a diagram showing a shield means rotated in accordance with the drive of the motor, (b) a diagram showing the shield means adapted to move along the lengthwise direction of the holder portion in accordance with the drive of the motor, and (c) a diagram showing a pair of shield means for covering the signal output means in accordance with the drive of the motor.

The vehicle key shown in FIG. 13 outputs a start permit signal to the vehicle such as a train, a motorbike or an automobile to start the prime mover of the vehicle. This vehicle key comprises a signal output means 900 for outputting the start permit signal, a breath component detection means 500 for detecting the alcohol contained in the breath of the user, a prevention means 1000 for preventing the output of the start permit signal to the vehicle from the signal output means 900 in accordance with the detection result of the breath component detection means 500, and a holder 200 having built therein the breath component detection means 500, the signal output means 900, the prevention means 1000, the source battery not shown, and the LED lamp. Each of these component parts is described in detail below.

The holder 200 is a rectangular case having an opening in opposed relation to the output port of the signal output means 900. A transparent plate member 210 is mounted on this opening. The holder 200 includes, in addition to the opening, a mounting hole, not shown, for exposing the start switch 700' and the LED lamp. Also, the holder 200 includes a guide portion 220 for guiding the shield means 1100 of the prevention means 1000 linearly movably. The guide portion 220 is a cylindrical member having an upper opening and one open end. As a result, the forward end portion of the shield means 1100 is adapted to be projected. A groove not shown in formed along the lengthwise direction on the lower surface of the guide portion 220. The shield plate 1110 and the protrusion 1120 of the shield means 1100 of the prevention means 1000 are fitted in this groove, which has an end thereof open to allow the shield plate 1110 to be projected therefrom.

The signal output means 900 outputs the start permit signal in the form of radio wave or infrared light toward the antenna or the receiving port of the vehicle. An immobilizer is an example.

The prevention means 1000 includes a shield means 1100 guided by the guide unit 220 of the holder portion 200 to linearly move from a shield position where the output of the start permit signal to the vehicle from the signal output means 900 is shielded to an evacuation position where the output of the start permit signal to the vehicle cannot be shielded, a spring 1200 fitted in the guide unit 220 for urging the shield means 1100 toward the shield position, a drive means (motor) 1400 for moving the shield means 1100 from the engaging position to the evacuation position through a gear unit 1300 in accordance with the detection result of the breath component detection means 500, and a position detection switch 1500 that is turned on when the shield means 1100 is located at the evacuation position.

The shield means 1100 is a bar-like member having a shield plate 1100 at the forward end thereof for shielding the start permit signal from the signal output means 900. The shield plate 1110 is formed of a permalloy or the like material easy to process. With the movement of the shield means 1100, the shield plate 1110 enters or leaves the groove of the guide portion 220. A protrusion 1120 fitted movably in the groove of the guide unit 220 is formed on the lower surface at the rear end of the shield means 1100, and a contact unit 1130 adapted to contact the position detection switch 1500 is arranged on one transverse side surface of the shield means 1100.

The gear unit 1300 includes gears 1310 to 1350 in mesh with each other for converting the rotational motion of the head portion of the drive means 1400 to the linear motion of the shield means 1100. The gear 1310 is in mesh with the head of the drive means 1400. The gear 1350 is arranged under the guide unit 220 of the case 200 and has a cam portion 1351 adapted to contact the protrusion 1120 of the shield means 1100. The gears 1320 to 1340 are interposed in mesh between the gears 1310 and 1350. Specifically, with the rotation of the drive means 1400, the cam portion 1351 of the gear 1350 is rotated through the gears 1310 to 1340. Thus, the cam portion 1351 comes into contact with and presses the protrusion 1120 of the shield means 1100, so that the shield means 1100 is moved from the shield position to the evacuation position against the urging force of the spring 1200.

The position detection switch 1500 is arranged at a position adapted to contact the contact unit 1130 of the shield means 1100 located at the evacuation position. The position detection switch 1500, once contacted by the contact unit 1130 of the shield means 1100, turns on and outputs the output signal to the control unit 520 of the breath component detection means 500.

The breath component detection means 500, as shown in FIG. 14, includes an alcohol sensor 510 and a control unit 520 for controlling the on/off operation of the drive means 1400 in accordance with the output signal of the alcohol sensor 510.

The alcohol sensor 510 is a well-known semiconductor sensor, which upon exhalation of the breath thereon for a predetermined time (about 2 seconds), changes in internal resistance, which change is output as an output signal. In this alcohol sensor 510, the alcohol, if contained in the breath, is attached to the catalyst in the sensor and the internal resistance thereof greatly changes. The alcohol attached to the catalyst is combusted and evaporated by heating up the alcohol sensor 510.

The control unit 520 is a microcomputer. The input port of the control unit 520 is connected with the alcohol sensor 510, the position detection switch 640 and the start switch 700', and the output port thereof connected with the motor 610 and the LED lamp. The memory of the control unit 520 has stored therein the alcohol concentration of 0.14 mg/L in the breath as a reference value.

Specifically, the control unit 520, based on the output signal of the alcohol sensor 510, measures the alcohol concentration in the breath of the user, compares the measurement value with the reference value, and upon determination that the measurement value is not less than the reference value, drives the motor 610.

Also, the memory has stored therein the alcohol concentration measurement program (FIG. 15). The control unit 520 implements the aforementioned function by executing the program. The control unit 520 has a timer circuit built therein.

The alcohol concentration measurement program executed by the control unit 520 is explained in detail below, together with the operation of the various parts of the vehicle and the method of use.

First, in standby mode, it is determined whether the start switch 700' has been held down or not (s1). In the process, the shield means 1100 is energized by the spring 1200 and located at the shield position. The start permit signal output from the signal output means 900, therefore, is shielded by the shield plate 1110 of the shield means 1100. As a result, the prime mover of the vehicle cannot be started.

Upon holding down of the start switch 700' a step 1, the control unit 520 starts the timer circuit. The alcohol sensor 510 is turned on, and caused to make preparation (heat up). Upon completion of the heat-up, the preparation is over and the LED lamp is turned on.

After that, it is determined whether a predetermined time (6 seconds in this case) has passed from the holding down of the start switch 700' or not with reference to the count value on the timer circuit (s2). Upon determination that the predetermined time has passed, the drive means 1400 is kept in the off state and the shield means 1100 kept at the shield position (s3). At the same time, the red LED lamp is turned on for five seconds. Then, the standby process of step 10 is executed as described later and the process returns to step 1. Upon determination that the predetermined time has not yet passed, on the other hand, it is determined whether the output signal of the alcohol sensor 510 is input or not (i.e. whether the breath is exhaled on the alcohol sensor 510 or not) (s4).

Upon determination that the breath is not exhaled, the process returns to step 2. Upon determination that the output signal is input and the breath is exhaled, on the other hand, the alcohol concentration in the breath of the user is measured based on the output signal of the alcohol sensor 510.

After that, this measurement value is compared with the reference value on the memory and it is determined whether the measurement value is not less than the reference value or not (i.e. whether the breath of the user contains the alcohol or not) (s5). Upon determination that the measurement is not less than the reference value (i.e. the breath of the user contains the alcohol of not less than the reference value), the drive means 1400 is kept in the off state and the shield means is maintained at the shield position (s6). The standby process is executed at step 10, and the process returns to step 1. Upon determination that the measurement value is less than the reference value, on the other hand, the green LED lamp is turned on and the drive means 1400 is driven. The gears 1310 to 1350 rotate, whereby the cam portion 1351 of the gear 1350 contacts and presses the protrusion 1200 of the shield means 1100. As a result, the shield means 1100 moves to the evacuation position from the shield position against the urging force of the spring 1200. Once the shield means 1100 is located at the evacuation position, the position detection switch 1500 turns on and outputs an output signal. Upon application of the output signal thereto, the drive means 1400 stops driving and the timer circuit is activated. In this way, the signal output means 900 becomes ready to output the start permit signal to the vehicle (s7). Thus, the user can start the prime mover of the vehicle by outputting the start permit signal of the signal output means 900 to the vehicle.

After that, with reference to the count value on the timer circuit, it is determined whether a predetermined time (30 seconds in this case) has passed or not from the lock is canceled (s8). Upon determination that the predetermined time has not yet passed, the same process is repeated. Upon determination that the predetermined time has so passed, on the other hand, the green LED lamp is turned off and the drive means 1400 is driven. Then, the gears 1310 to 1350 rotate, whereby the cam portion 1351 of the gear 1350 ceases to be in contact with the protrusion 1120 of the shield means 1100. Then, the shield means 1100 is linearly moved from the evacuation position to the shield position by the urging force of the spring 1200. The position detection switch 640 turns off, and the output signal thereof ceases to be input, thereby stopping the drive of the shield means 1100. In this way, the output of the start permit signal of the signal output means 900 to the vehicle is shielded again by the shield means 1100 (s9).

After that, the standby process is executed by extinguishing the LED lamp and turning off the alcohol sensor 510 (s10), and the process returns to step 1.

With this vehicle key, as long as the alcohol concentration in the breath of the user remains less than the reference value, the start permit signal can be output from the signal output means 900, and therefore the prime mover of the vehicle can be started. In the case where the alcohol concentration in the breath of the user is not less than the reference value, on the other hand, the output of the start permit signal to the vehicle from the signal output means 900 is kept shielded by the shield means 1100, and therefore the signal output means 900 cannot output the start permit signal to the vehicle. Specifically, the prime mover of the vehicle cannot be started, thereby effectively preventing the drunken driving.

The vehicle key according to the fourth and fifth embodiments described above can be changed in design any way as long as the start permit signal can be output to the vehicle such as a train, a motorbike or an automobile and the prime mover of the vehicle can be set in a state capable of being started on the one hand, and the vehicle key comprises a signal output means for outputting the signal, a breath component detection means for detecting the alcohol contained in the breath of the user and a prevention means for preventing the output of the start permit signal to the vehicle from the signal output means in accordance with the detection result of the breath component detection means on the other hand. Specifically, the invention is applicable not only to the vehicle of which the prime mover is started by the start permit signal from the signal output means as described above, but also to the vehicle of which the prime mover is set in a state capable of being started by holding down a start button or the like on the vehicle.

The prevention means 1000 may assume any form as long as it can prevent the output of the start permit signal to the vehicle from the signal output means 900. For example, the signal output means 900 is rotated, and the start permit signal of the signal output means may be output to the parts other than the plate member 210 of the holder 200.

The shield means 1100 is a bar-like member having the shield plate 1110 at the forward end thereof as described above. Nevertheless, any configuration can be employed in which the start permit signal of the signal output means may be shielded. As shown in FIG. 16(*a*), for example, a cylindrical shield means 1100 of permalloy or the like may be used to rotate the shield means 1100 and shield the signal output means 900 in accordance with the drive of the motor 610. Also, as shown in FIG. 16(*b*), the cylindrical shield means 1100 is moved along the lengthwise direction of the holder portion thereby to shield the signal output means 900. In this case, the output unit of the signal output means 900 is kept shielded, and therefore the signal of the signal output means 1100 is required to be strengthened. Further, as shown in FIG. 16(*c*), the shield means 1100 may include a first shield portion 1101 fixed on the holder portion 200 or the like, and a second shield portion 1102 for shielding a part of the signal output means 900 and the first shield portion 1101 in accordance with the drive of the motor 610.

The breath component detection means 500 includes the alcohol sensor 510 and the control unit 520 as described above. However, any configuration which can realize a similar function can be employed. The reference value stored in the memory of the control unit 520 is illustrative and can be set to any arbitrary value. As another alternative, a configuration without the reference value can be employed in which with even a slight amount of alcohol detected by the alcohol sensor 510, the signal output means 900 is not turned on or the drive means 1400 of the prevention means 1000 is not activated.

The start switch 700' may or may not included. In this case, the alcohol sensor 510 is required to be kept on. The power switch 700 and the start switch 700' of any type can of course be used.

Sixth Embodiment

Figure 17:
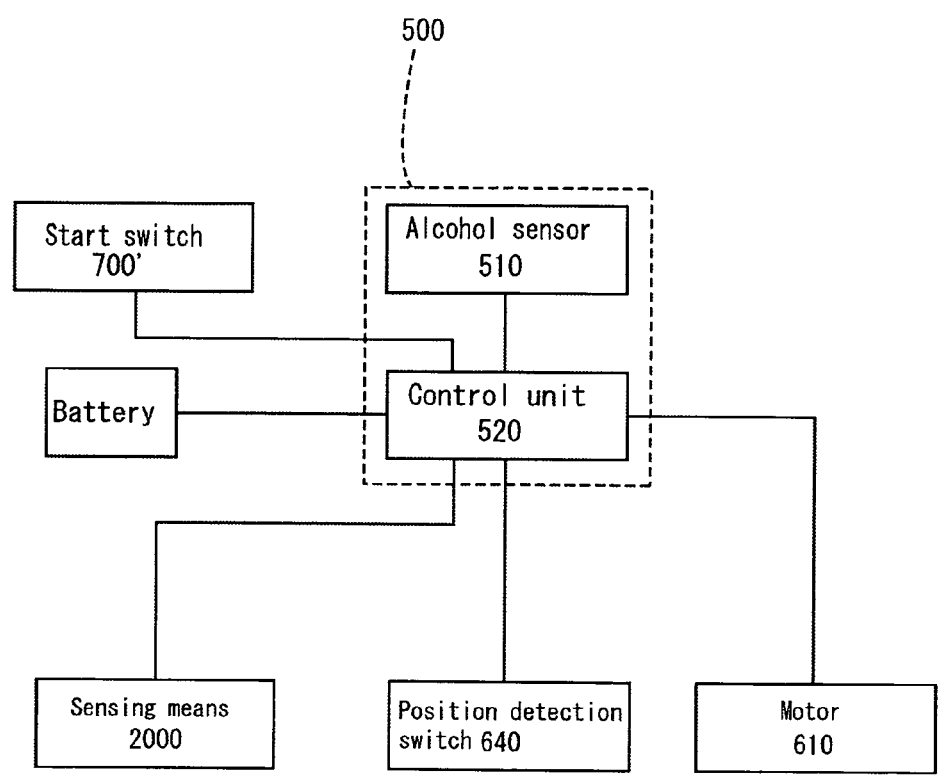
FIG. 17 is a block diagram of the vehicle key according to a sixth embodiment of the invention.
Figure 18:
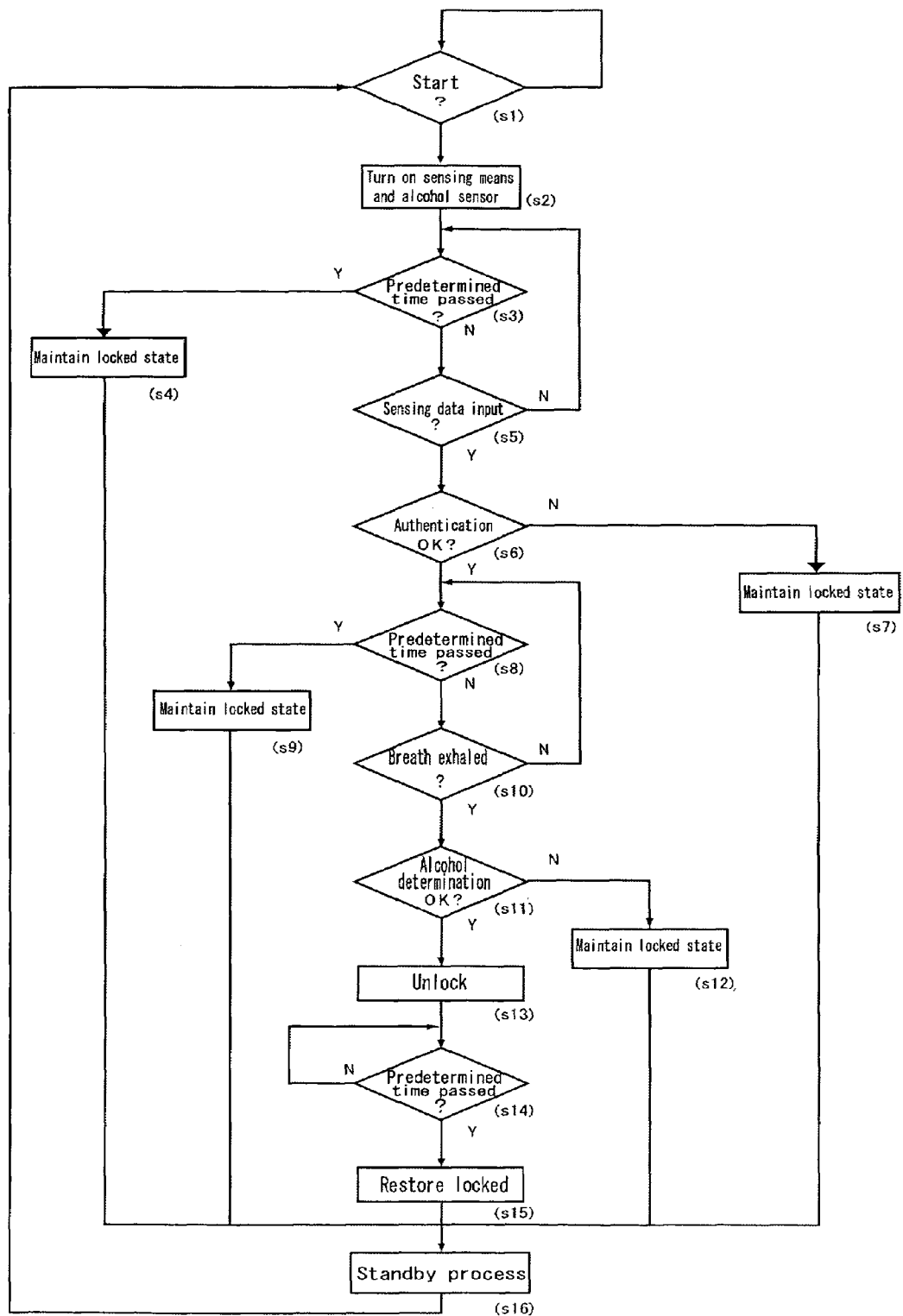
FIG. 18 is a flowchart of an authentication and an alcohol determination program.

The vehicle key according to a sixth embodiment of the invention is explained below with reference to the drawings. FIG. 17 is a block diagram of the vehicle key according to the sixth embodiment of the invention, and FIG. 18 a flowchart for the authentication process and the alcohol determination program.

The vehicle key shown in FIG. 17 is substantially similar in configuration to the vehicle key according to the second embodiment, the only difference being the provision of the sensing means 2000 for reading the physical feature of the user. This difference is explained in detail below and the duplicated portions are not explained.

The sensing means 2000 may be a fingerprint authentication sensor, an image pickup means such as a camera for reading the pattern of the blood vessel, the irises, the face or the signature, or a voice detection means for detecting the voice of the user. Specifically, the sensing means 2000 is configured to read the physical feature (such as the fingerprints, the blood vessel pattern, the irises, the face or the signature) of the user or detect the voice of the user and outputs the resulting sensing data to the control unit 520 of the breath component detection means 500.

The input port of the control unit 520 is connected with the sensing means 2000. The memory of this control unit 520, instead of the alcohol concentration measurement program, has stored therein the authentication program and the alcohol determination program shown in FIG. 18. Also, the memory has stored therein the reference data of the physical feature of the user (such as the fingerprints, blood vessel pattern, irises, face or the signature, user's voice). This reference data is read through the sensing means 2000 and stored in the memory at the time of initialization. The control unit 520 exhibits the function of alcohol determination and authentication by executing the authentication and alcohol determination program described above.

The authentication and alcohol determination program executed by the control unit 520 is described in detail below, together with the operation of the various parts of the vehicle key and the method of use thereof.

First, in standby mode, it is determined whether the start switch 700' is held down or not (s1). In the process, the projection member 300 is urged by the spring 400 while at the same time being locked by the lock mechanism 600 (i.e. locked in such a manner that the plunger 620 energized by the spring 630 comes to engage the depression 301 of the projection member 300), thereby keeping the projection member 300 in a projected state (refer to FIG. 4). In an attempt to insert the key portion 100 into the key hole of the vehicle, therefore, the forward end portion of the projection member 300 comes into contact with the edge of the key hole and therefore only a part of the forward end portion 110 of the key portion 100 can be inserted into the key hole.

Upon holding down of the start switch 700' at step 1, the sensing means 2000 and the alcohol sensor 510 are turned on, so that the alcohol sensor 510 begins the preparation (heat-up) (s2). Upon completion of the heat-up, the preparation is over and the green LED lamp is turned on. At the same time, the timer circuit is started.

After that, with reference to the count value on the timer circuit, it is determined whether a predetermined time (6 seconds in the case under consideration) has passed or not from the holding down of the start switch 700' (s3). When it is determined that the predetermined time has passed, the motor 610 is kept in the off state, and the lock mechanism 600 is kept locked (s4). In the process, the red LED lamp is turned on for five seconds, while at the same time turning off the timer circuit. Then, the standby process described later is executed at step 16, and the process returns to step 1.

Upon determination at step 3 that the predetermined time has not passed, it is determined whether the sensing data has been input from the sensing means 2000 or not (s5). Upon determination that no sensing data is input, the process returns to step 3. Upon determination that the sensing data is input, on the other hand, the detection data (such as the image data of the fingerprints, the blood vessel pattern, the irises, the face or the signature of the user, the voice data of the user, etc.) is prepared based on the sensing data and compared with the reference data on the memory thereby to execute the authentication process to identify the person involved as a user (s6).

In the case where the authentication process shows that the person is not the legitimate user, the motor 610 is kept in the off state and the lock mechanism 600 maintains the locking state (s7). At the same time, the red LED lamp is turned on for five seconds. Then, the standby process of step 16 is executed, and the process returns to step 1.

Upon determination by the authentication process at step 6 that the person is the legitimate user, the authentication is successful and the green LED lamp is turned on. At the same time, the timer circuit is reset, and with reference to the count value on the timer circuit, it is determined whether a predetermined time (one second or two) has passed or not from the successful authentication (s8). This predetermined time is about a time length during which no other person than the user can make the alcohol determination described later after the authentication process. When it is determined that the predetermined time has passed, the motor 610 is kept in the off state, and the lock mechanism 600 is kept locked (s9). At the same time, the red LED lamp is turned on for five seconds, while at the same time turning off the timer circuit. The standby process of step 16 is executed and the process returns to step 1.

Upon determination at step 8 that the predetermined time has yet to pass, it is determined whether the output signal is input from the alcohol sensor 510 or not (i.e. whether the breath is exhaled on the alcohol sensor 510 or not) (s10). Upon determination that not breath has been exhaled, the process returns to step 8. Upon determination that the output signal is input and the breath is so exhaled, on the other hand, the alcohol concentration in the breath of the user is measured based on the output signal of the alcohol sensor 510.

After that, the measurement value is compared with the reference value on the memory to determine whether the measurement value is not less than the reference value (i.e. whether the alcohol of not less than the reference value is contained in the breath of the user) (s11). Upon determination that the measurement value is not less than the reference value (i.e. the alcohol in an amount not less than the reference value is contained in the breath of the user), the motor 610 is kept in the off state while the lock mechanism 600 maintains the locking mode (s12). At the same time, the red LED lamp is turned on for 30 seconds. The standby process of step 15 is executed and the process returns to step 1. Upon determination that the measurement value is less than the reference value, on the other hand, the green LED lamp is turned on while at the same time starting the motor 610. Then, the gears 651 to 655 rotate and the cam portion 655a of the gear 655 comes into contact with and presses the protrusion 621 of the plunger 620. As a result, the plunger 620 moves to the evacuation position from the engaging position against the urging force of the spring 630. Once the plunger 620 is located at the evacuation position, the position detection switch 640 turns on and outputs an output signal. Upon application of this output signal thereto, the motor 610 stops, and the timer circuit is started. In this way, the lock mechanism 600 turns to the unlocking mode (s13).

Once the locking mode is canceled, the user can insert the whole key portion 100 into the key hole of the vehicle (refer to FIG. 5). Once the key portion 100 is inserted into the key hole, the forward end portion of the projection member 300 in projected state comes into contact with the edge of the key hole and the projection member 300 is accommodated in the holder portion 200 against the urging force of the spring 400. As a result, the whole forward end portion 110 of the key portion 100 can be inserted into the key hole, and therefore the prime mover of the vehicle can be started.

After that, it is determined with reference to the count value on the timer circuit whether a predetermined time (30 seconds in this case) has passed from the unlocking operation or not (s14). Upon determination that the predetermined time has not passed, this process is repeated. Upon determination that the predetermined time has passed, on the other hand, the green LED lamp is turned off while at the same time starting the motor 610. Then, the gears 651 to 655 rotate, whereby the cam portion 655a of the gear 655 ceases to contact the protrusion 621 of the plunger 620. Then, the plunger 620 is moved linearly from the evacuation position by the urging force of the spring 630 and the position detection switch 640 is turned off. With the turning off of the position detection switch 640 and the cessation of the input of the output signal, the drive of the motor 610 is stopped. As a result, the lock mechanism 600 becomes ready to lock again (s15).

In the case where the key portion 100 is not inserted into the key hole at step 15, the plunger 620 is fitted in the depression 301 of the projection member 300 thereby to restore the locking state of the lock mechanism 600. In the case where the forward end portion 110 of the key portion 100 is inserted into the key hole, on the other hand, the projection member 300 is accommodated in the holder portion 200, and therefore the plunger 620 fails to engage the depression 301 of the projection member 300 and comes into contact with the side surface thereof. After that, when the key portion 100 is pulled off from the key hole, the projection member 300 is moved in the direction of projection from the holder portion 200 by the urging force of the spring 400. In the process, the plunger 620 is fitted in the depression 301 of the projection member 300, and the lock mechanism 600 restores the locking state.

After that, the LED lamp and alcohol sensor 510 are turned off and the standby process executed (s16), after which the process returns to step 1.

This vehicle key can produce the same effects as the second embodiment. In addition, the provision of the sensing means for reading the physical features of the user and the fact that the alcohol determination process is conducted after the authentication process based on the sensing data of the sensing means can suppress the unfair use in which the lock mechanism 600 is illegally unlocked. Also, the persons other than the user cannot use the vehicle key, and therefore the vehicle is prevented from being stolen using the key, thereby contributing to the crime prevention.

Especially in the case where the voice detection means or the image pickup means for reading the irises (iris camera) as a sensing means 2000, the voice uttered by the legitimate user is detected by the voice detection means or the image of the irises of the user is picked up by the camera, after which the breath is required to be exhaled on the alcohol sensor 510 by the user within a predetermined time (one second or two). Specifically, the persons other than the user cannot exhale the breath on the alcohol sensor 510 on behalf of the user, and therefore the lock mechanism 600 is prevented from being unlocked illegally. In this case, a microphone having such a directivity as to catch only the sound in a predetermined direction is used as a voice detection means. The sensitivity of the microphone is such as to be capable of catching the sound at the distance (about 1 cm to 20 cm) between the microphone and the sound source (i.e. the mouth). The use of the microphone having this directivity makes impossible the situation in which, with a person other than the user holding the vehicle key and prepared for exhaling the breath on the alcohol sensor 510, the user utters a voice in the neighborhood of the person other than the user to cause the voice detection means to detect the voice of the user so that the control unit 520 grants an authentication.

The control unit 520 makes an authentication and within a predetermined time thereafter, an alcohol determination as described above. As an alternative, the authentication process and the alcohol determination can be carried out at the same time, or the authentication process may be carried out within a predetermined time after the alcohol determination. Also, the control unit 520 may be configured to have the function of turning on the alcohol sensor 510 upon determination that the user is successfully authenticated. This design change can produce a similar effect to the aforementioned cases. In the case where the authentication process determines that the legitimate user is not involved, several determination sessions may be repeated. Also, the physical features of several persons as well as the user himself/herself are desirably recorded as a reference data in the memory. The reference data can be desirably recorded in the memory only by the distributors or agents selling the vehicle key but not by the user. In the case where the fingerprint authentication sensor is used, this sensor can be used in place of the power switch or the start switch.

The sensing means 2000 may not be arranged on the holder portion 200. Specifically, the sensing means 2000 may be formed as an independent entity connected to the vehicle key through a radio or wired communication means.

The vehicle key according to the sixth embodiment is described above as a configuration having the sensing means 2000 of the vehicle key according to the second embodiment. Nevertheless, the vehicle key according to the first, third, fourth, or fifth embodiment may also have the sensing means 2000. Of course, a program similar to the authentication and alcohol determination program can be used as a program to be executed by the control unit 520.

Seventh Embodiment

Figure 19:
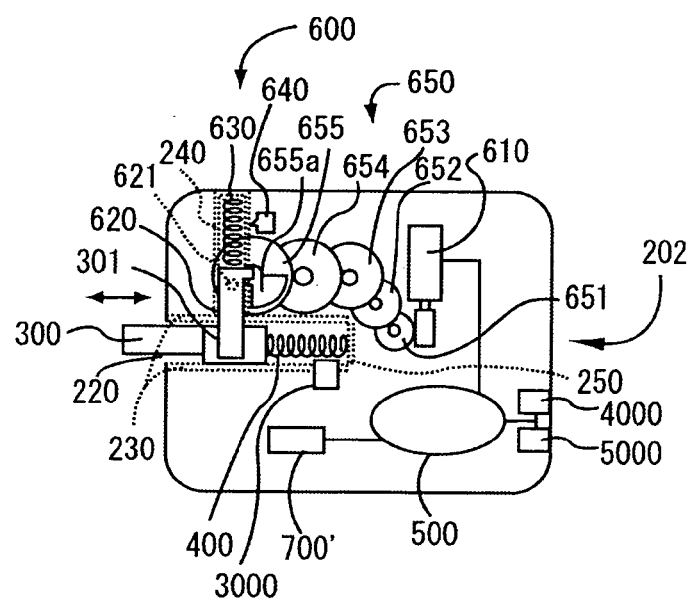
FIG. 19 is a schematic diagram showing the other case of the vehicle key according to a seventh embodiment of the invention.

A vehicle key according to a seventh embodiment of the invention is explained below with reference to the drawings. FIG. 19 is a schematic diagram showing the other case of the vehicle key according to the seventh embodiment of the invention, FIG. 20 a block diagram of the same key, and FIG. 21 a flowchart of the vehicle ride recording program as an example of design change of the same key, in which (a) is a diagram showing the state in which the key portion and the signal output means are open, and (b) a diagram showing the state in which the key portion and the signal output means are accommodated.

Figure 20:
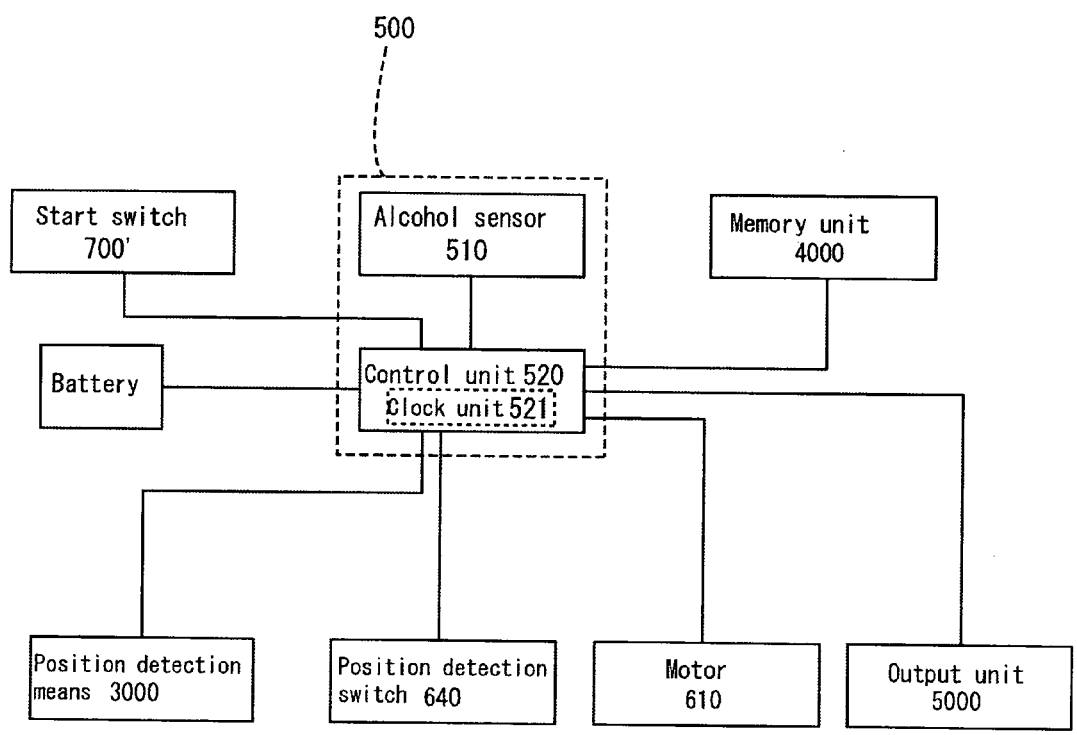
FIG. 20 is a block diagram of the same key.

The vehicle key shown in FIGS. 19, 20 has a substantially similar configuration to the vehicle key according to the second embodiment, and the difference lies in that the vehicle key according to this embodiment comprises a position detection means 3000 for detecting that the projection member 300 is accommodated in the case 202 of the holder portion 200, a memory unit 4000 for recording the detection result of the position detection means 3000 and an output unit 5000 for outputting the data of the memory unit 4000. This difference is explained in detail below, while the duplicated portions are not explained again.

A position detection switch is used as the position detection means 3000. This position detection means 3000 is arranged at such a position adapted to contact a part of the projection member 300 accommodated in its entirety in the case 202 of the holder portion 200. The position detection means 3000 is turned on by being contacted by a part of the projection member 300 and outputs the output signal to the control unit 520 of the breath component detection means 500. By detecting the accommodated position of the projection member 300 in this way, the user riding in the vehicle can be detected.

The memory unit 4000 is for recording the data in response to an instruction from the control unit 520. This memory unit 4000 has recorded therein the fact that the output signal of the position detection means 3000 has been input (i.e. the fact that the user is riding the vehicle) and the time thereof.

Figure 21:
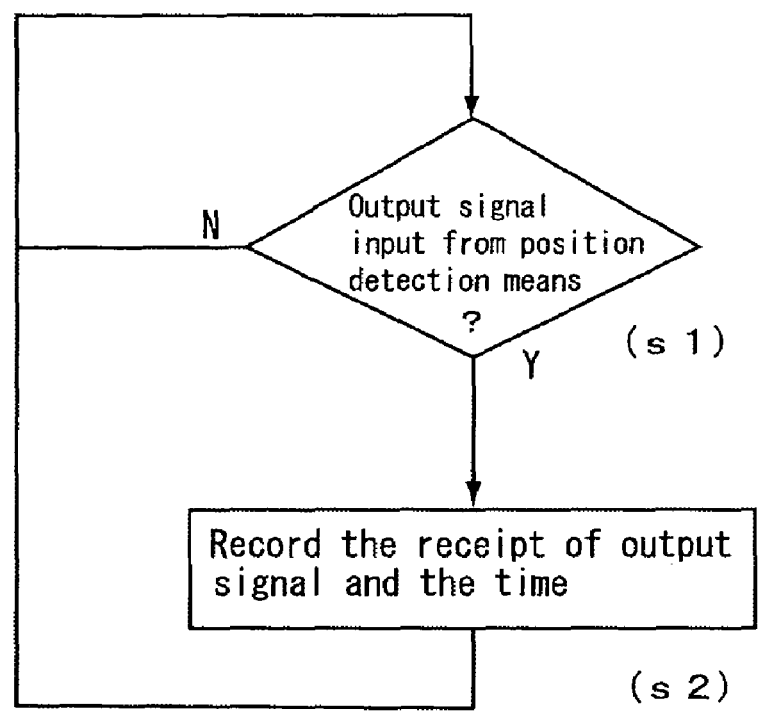
FIG. 21 is a flowchart of a vehicle ride record program.

The control unit 520 is a microcomputer having built therein a clock unit 521 for counting the time. The control unit 520 has the input port thereof connected the position detection means 3000 and the memory unit 4000 and the output port thereof connected to the memory unit 4000 and the output unit 5000. The control unit 520, when supplied with the output signal of the position detection means 3000, has the function of recording the fact indicating that the user is riding in the vehicle and the current time in the memory unit 4000 with reference to the clock unit 521. The vehicle ride record program shown in FIG. 21 is recorded in the memory of the control unit 520. The control unit 520 exhibits this function by executing the vehicle ride record program.

The output unit 5000 is an output terminal. Specifically, by connecting a computer or the like to the output unit 5000, the data recorded in the memory nit 4000 can be read.

The vehicle ride record program executed by the control unit 520 and the operation of each part are explained in detail. First, in standby mode, it is determined whether the output signal of the position detection means 3000 has been input or not (s1). Specifically, it is determined whether the user is riding in a vehicle or not. In the process, the forward end portion 110 of the key portion 100 is inserted into the key hole and the projection member 300 comes into contact with the edge of the key hole. Thus, the forward end portion 110 is accommodated in the case 202 of the holder portion 200 (i.e. the user rides the vehicle). Then, a part of the projection member 300 accommodated in the case 202 of the holder portion 200 comes into contact with the position detection means 3000, so that the position detection means 3000 is turned on and outputs an output signal. Then, step 1 determines that the output signal of the position detection means 3000 has been input, and the fact that the output signal is input is recorded in the memory unit 4000 indicating that the user is riding in the vehicle, while at the same time recording the present time in the memory unit 4000 by reference to the clock unit 521 (s2). Then, returning to step 1, the same process is repeated.

In this way, the data (the input of the output signal of the position detection means 3000 and the history thereof) recorded in the memory unit 4000 is output through the output unit 5000 at predetermined time intervals.

With this vehicle key, the history of the user riding in the vehicle and the time involved are recorded in the memory unit 4000. By outputting the data from the memory 4000 at predetermined time intervals, therefore, the data concerning the user riding in the vehicle can be utilized for the operation management.

The position detection means 3000 is a position detection switch as described above. Nevertheless, any member capable of implementing a similar function can alternatively be used. The output unit 5000, on the other hand, may be constituted of a communication unit for transmitting the data on the memory unit 4000 sequentially to a management center not shown.

The vehicle key according to this embodiment can of course have other devices, such as a GPS transmitter, a charge circuit for charging the power battery and a remote controlled door lock mechanism for remotely controlling the door lock by outputting a signal to the vehicle.

In the presence of the GPS transmitter, the GPS signal from the GPS transmitter is received by the management center through a GPS satellite, whereby the vehicle key can be used for detecting the position of the vehicle key holder or controlling the operation of the vehicle associated with the vehicle key.

In the presence of the charge circuit, an AC adaptor, for example, is connected to the charge circuit thereby to charge the source battery. In this case, the residual capacity of the source battery is detected and in the case where the detected value is not more than a predetermined value, the LED lamp or the like is lit to inform the user.

In the embodiment described above, the breath component detection means is configured as an alcohol sensor for detecting the alcohol contained in the breath of the user. As an alternative to the alcohol sensor, a drug sensor for detecting narcotics such as the drug or the thinner may be included. Of course, a configuration having both the alcohol sensor and the drug sensor is also applicable.

Figure 22:
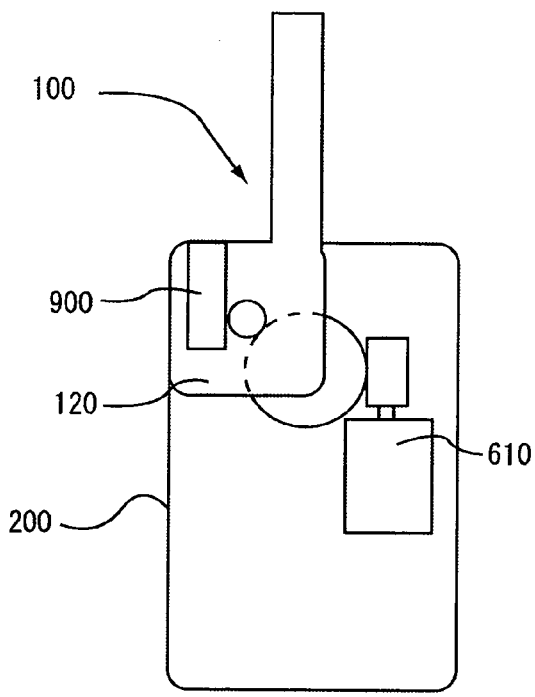
FIGS. 22(a) to (b) are Diagrams showing an example of design change of the same key, in which (a) is a diagram showing a state in the key portion and the signal output means are open, and (b) a diagram showing a state in which the key portion and the signal output means are accommodated.
Figure 22:
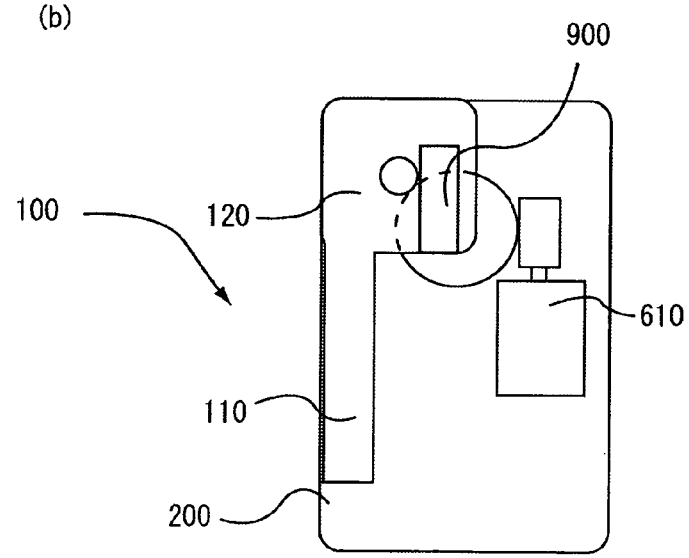

The vehicle key according to the first, second, or third embodiment can be combined with the vehicle key according to the fourth or fifth embodiment. As shown in FIG. 22, for example, the signal output means 900 is arranged at the base end portion of the key portion 1000, and the base end portion 120 is held rotatably on the holder portion 200. The rotary shaft 121 of the base end portion 120 is formed with a threaded groove adapted to engage the gear unit, and the motor 610 is connected through this gear. Specifically, the control unit 520 drives the motor 610 in accordance with the output signal of the alcohol sensor 510, so that the key portion 100 is rotated around the rotary shaft 121 of the base end portion 120, and in accordance with this rotation, the forward end portion 110 of the key portion 100 is moved from the position (FIG. 22(*b*)) at which it is accommodated in the holder portion to the projection position (FIG. 22(*a*)) at which the forward end portion 110 is projected from the holder portion 200. At the same time, the output port of the signal output means 900 moves from the position (FIG. 22(*b*)) directed into the holder portion 200 to the position (FIG. 22(*a*)) directed outward. In this case, the motor 610 functions as a retaining means and a projection means.

Also, the vehicle key constituted of a combination of the examples described above can of course be combined with the sixth and seventh embodiments.

Eighth Embodiment

Figure 23:
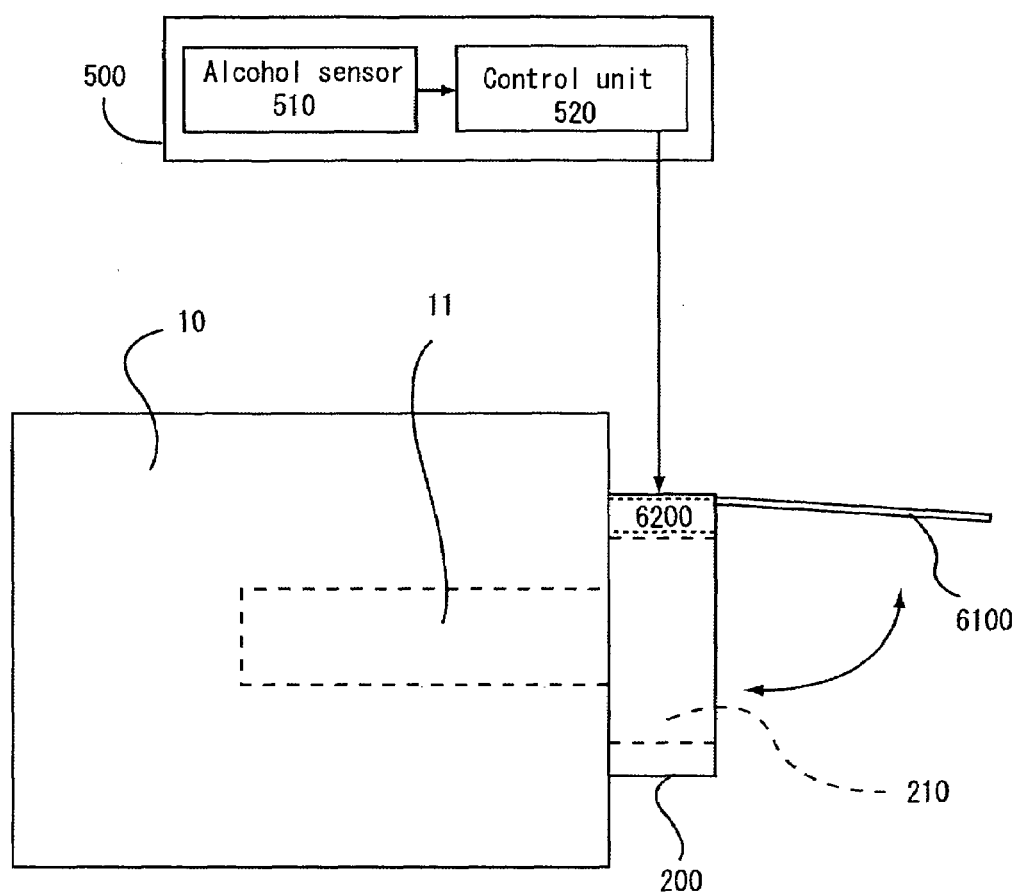
FIG. 23 is a schematic diagram showing a drunken driving preventing device according to an eighth embodiment of the invention.

A drunken driving preventing device according to an eighth embodiment of the invention is explained below with reference to the drawings. FIG. 23 is a schematic diagram showing a drunken driving preventing device according to the eighth embodiment of the invention, and FIG. 24 a flowchart of the alcohol concentration measurement program.

The drunken driving preventing device shown in FIG. 23 is mounted on a vehicle 10 such as a train, a motorbike or an automobile, and configured substantially in a similar manner to the vehicle key according to the second embodiment. The difference lies in the shape of the holder portion 200 and the insertion prevention means for preventing the key from being inserted into the key hole of the vehicle 10. The difference is explained in detail below, while omitting the explanation of the duplicated portions.

The holder portion 200 is a cylindrical member mounted on the vehicle 10 and has a hole portion 210 for exposing the key hole 11. The holder portion 200 is mounted on the vehicle 10 with adhesive or the like. The hole portion 210 makes up a hole into which the vehicle key is inserted and a hole for insertion into the key hole 11.

The insert prevention means includes an on/off door 6100 mounted rotatably on the holder portion 200, and a drive means 6200 such as a motor for rotating the on/off door 6100 from an open position for opening the hole portion 210 to a close position for closing the hole portion 210. Also, the rotary shaft of the on/off door 6100 has a gear unit (not shown) in mesh with the head portion (not shown) of the drive means 6200. Specifically, the drive means 6200 is driven so that the head portion thereof is rotated, whereby the on/off door 220 opens/closes the hole portion 210 of the holder portion 200.

The breath component detection means 500 has substantially the same configuration as the breath component detection means 500 according to the second embodiment. The difference lies in that the control unit 520 measures the alcohol concentration in the breath of the user based on the output signal of the alcohol sensor 510, compares the measurement value with the reference value, and in the case where the result shows that the measurement value is not less than the reference value, drives the drive means 6200.

Figure 24:
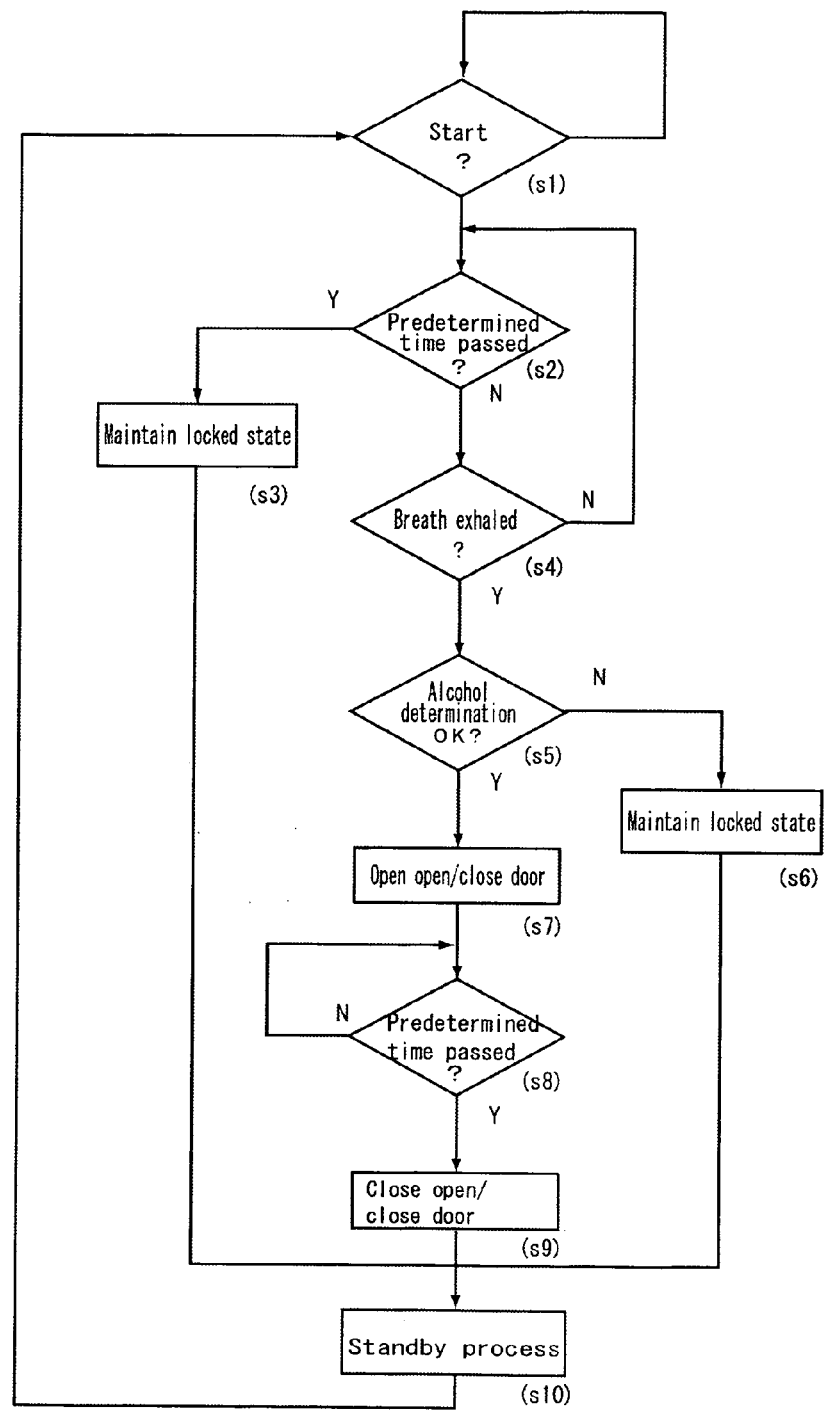
FIG. 24 is a program flowchart of an alcohol concentration measurement program.

The memory of the control unit 520 has stored therein the reference value of the alcohol concentration as in the second embodiment and the alcohol concentration measurement program shown in FIG. 24. The control unit 520 can implement the function described above by executing the alcohol concentration measurement program. The control unit 520 has a timer circuit built therein.

The alcohol concentration measurement program executed by the control unit 520 and shown in FIG. 24 is explained in detail, together with the operation of the various parts of the vehicle key and the method of using the same.

First, in standby mode, it is determined whether the start switch 700' has been held down or not (s1). In the process, the on/off door 6100 is closed and the holder portion 200 closes the hole portion 210. Therefore, the vehicle key cannot be inserted into the key hole.

Upon holding down of the start switch 700' at step 1, the timer circuit is started. Then, the alcohol sensor 510 is turned on, thereby causing the alcohol sensor 510 to make preparation (heat-up). Upon completion of the heat-up, the preparation is over and the green LED lamp is turned on.

After that, it is determined with reference to the count value on the timer circuit whether a predetermined time (6 seconds in this case) has passed or not after holding down of the start switch 700' (s2). Upon determination that the predetermined time has so passed, the drive means 6200 is kept in the off state (s3). At the same time, the red LED lamp is turned on for five seconds. Then, the standby process of step 10 described later is executed, and the process returns to step 1. Upon determination that the predetermined time has not passed, on the other hand, it is determined whether the output signal of the alcohol sensor 510 is input or not (i.e. whether the breath is exhaled on the alcohol sensor 510 or not) (s4).

Upon determination that the breath has not been so exhaled, the process returns to step 2. Upon determination that the output signal is input and the breath has been exhaled, on the other hand, the alcohol concentration in the breath of the user is measured based on the output signal of the alcohol sensor 510.

After that, the measurement value is compared with the reference value on the memory, and it is determined whether the measurement value is not less than the reference value (i.e. whether the alcohol of not less than the reference value is contained in the breath of the user or not) (s5). Upon determination that the measurement value is not less than the reference value (i.e. the alcohol in the amount not less than the reference value is contained in the breath of the user), the drive means 6200 is kept in the off state (s6). At the same time, the red LED lamp is turned on for 30 seconds. The standby process of step 10 is executed, and the process returns to step 1. Upon determination that the measurement value is less than the reference value, on the other hand, the green LED lamp is turned on while at the same time starting the drive means 620. Then, the on/off door 6100 rotates from close to open position, and the timer circuit is activated at the same time. In this way, the on/off door 6100 is located at open position (s7). As a result, the hole portion 210 of the holder portion 200 is opened, and therefore the key can be inserted into the key hole 11.

After that, with reference to the count value on the timer circuit, it is determined whether the predetermined time (30 seconds in this case) has passed from the time of opening the on/off door 6100 (s8). Upon determination that the predetermined time has not passed, the same process is repeated. Upon determination that the predetermined time has passed, on the other hand, the green LED lamp is turned off while at the same time activating the drive means 6200. The on/off door 6100 rotates from the open to close position (s9). As a result, the hole portion 210 of the holder portion 200 is closed again.

After that, the standby process including the turning off of the LED lamp and the turning off of the alcohol sensor 510 is executed (s10), and the process returns to step 1.

With this drunken driving preventing device, in the case where the alcohol concentration in the breath of the user is less than the reference value, the on/off door 6100 rotates from close to open position, and the hole portion 210 of the holder portion 200 is opened, thereby making it possible to insert the key into the key hole 11. In the case where the alcohol concentration in the breath of the user is not less than the reference value, on the other hand, the on/off door 6100 is located at the close position, and the hole portion 210 of the holder portion 200 is kept closed. Therefore, the key cannot be inserted into the key hole 11, and the prime mover of the vehicle cannot be started. As a result, the drunken driving can be prevented effectively.

The drunken driving preventing device is mounted on or built in a vehicle such as a train, a motorbike or an automobile, and can be changed in design in any manner as long as it comprises a breath component detection means for detecting the alcohol contained in the breath of the user and an insert prevention means for preventing the insertion of the key into the key hole of the vehicle in accordance with the detection result of the breath component detection means.

Specifically, the breath component detection means 500, which includes the alcohol sensor 510 and the control unit 520 as described above, may include any other means as long as a similar function can be realized. The reference value stored in the memory of the control unit 520 is illustrative and can be set to any arbitrary value. Also, instead of the reference value, a configuration may be employed in which the lock mechanism 600 is not unlocked in the case where even a slight amount of alcohol is detected by the alcohol sensor 510. The breath component detection means 500 is described as a configuration having the alcohol sensor 510 for detecting the alcohol contained in the breath of the user. In place of the alcohol sensor, however, a drug sensor for detecting a drug such as a narcotic or thinner may be used. Both the alcohol sensor and the drug sensor can of course be included in a configuration.

The insert prevention means includes the on/off door 6100 and the drive means 6200 for rotating the on/off door 6100 as described above. As long as the key insertion into the key hole 11 can be prevented, however, any means can be employed.

For example, the on/off door 6100 may be replaced with a configuration in which the projection member is projected in such a manner as to cover at least a part of the key hole 11 so that the key cannot be inserted into the key hole 11. The on/off door 6100 can be configured to close the hole portion 210 of the holder portion 200 to such a degree that the key cannot be inserted into the key hole 11.

In a vehicle having a start operation unit (such as a start button) for starting the prime mover in place of the key hole 11, the insert prevention means functions as an operation prevention means to prevent the operation of the start operation unit in accordance with the detection result of the breath component detection means 500. Also, in a vehicle having a receiving unit for receiving the start permit signal output from the vehicle key instead of the key hole for starting the prime mover in place of the key hole 11, the insert prevention means functions as an switching means to control the on/off operation of the receiving unit of the vehicle in accordance with the detection result of the breath component detection means 500. In this case, the on/off door 6100 is configured to close the hole portion 210 of the holder portion 200 in its entirety. The operation prevention means and the switching means cannot employ a configuration with a projection member. In the case where the receiving unit is arranged in the neighborhood of the key hole 11 or the start operation unit, the switching means may cover both the key hole 11 or the start operation unit and the receiving unit.

This drunken driving preventing device can be built in the vehicle as described above. In this case, the insert prevention means is so configured that the on/off door 6100 closes the front or the internal space of the key hole 11 to prevent the key from being inserted or that the projection member is projected into the front or internal space of the key hole 11 to prevent the key from being inserted. The operation prevention means is configured in such a manner that the front surface of the start operation unit is closed by the on/off door 6100 to prevent the depression thereof or a part of the start operation unit and the start operation unit are engaged with each other by the projection member to prevent the depression thereof. The switching means is so configured that the on/off door 6100 closes the front surface of the start operation unit to prevent the depression thereof.

The alcohol sensor 510 of the drunken driving preventing device can be an independent member. In this case, the output signal of the alcohol sensor 510 is output to the control unit 520 through a radio or wired communication means. In the case where a radio communication channel is used, a portable information terminal such as a remote controller can be used or the communication means may be built in the existing portable information terminal such as a mobile phone. In the case where a wired communication line is used, on the other hand, a portable information terminal such as a remote controller may be arranged on the vehicle or built in the steering wheel of the vehicle.

The drunken driving preventing device can of course have built therein the sensing means 2000 of the vehicle key according to the sixth embodiment or the related configuration. The sensing means 2000 with or without the alcohol sensor 510 may be an independent member.

What is claimed is:

1. The vehicle key capable of being inserted into a key hole of a vehicle including a train, a motorbike and an automobile, and used for starting a prime mover of the vehicle, the key comprising:

a key portion having a forward end portion insertable into the key hole of the vehicle;

a holder portion for holding a base end portion of the key portion;

a breath component detection means for detecting at least one of alcohol and drug contained in a breath of a user; and an insert prevention means comprising a projection member projectable from the holder portion so as to prevent insertion of the key portion into the key hole of the vehicle, the insert prevention means being adapted to accommodate the projection member in the holder portion in accordance with a detection result of the breath component detection means, wherein the insert prevention means includes:

the projection member projectable from the holder portion along the key portion;

a spring for urging the projection member in a direction of the projection; and a lock mechanism for locking and maintaining the projection member in a projected state, and for unlocking the projection member in accordance with the detection result of the breath component detection means, and wherein the lock mechanism includes:

a plunger configured as a member engageable with a depression on a side surface of the projection member, and disposed on the holder portion linearly movably from an engaging position, at which the plunger engages with the depression of the projection member, to an evacuation position, at which the plunger fails to engage with the depression of the projection member; and a drive means for moving the plunger from the engaging position to the evacuation position in accordance with the detection result of the breath component detection means.

2. The vehicle key according to claim 1, wherein the breath component detection means includes:

at least one of an alcohol sensor and a drug sensor; and a control unit for controlling an on/off operation of the drive means in accordance with an output signal of the at least one of the alcohol sensor and the drug sensor.

3. The vehicle key according to claim 1, wherein the projection member is disposed inside the key portion and movable along the key portion.

4. The vehicle key according to claim 1, further comprising:

a sensing means for reading a physical feature of the user, wherein the breath component detection means includes:

at least one of an alcohol sensor and a drug sensor; and a control unit for authenticating the user based on sensing data of the sensing means, and for performing at least one of alcohol determination and drug determination to determine whether at least one of alcohol and drug is contained in the breath of the user in accordance with an output signal of the at least one of the alcohol sensor and the drug sensor, and the control unit has a function of controlling an on/off operation of the drive means, either in a case where the user is not authenticated as a result of the authentication, or in a case where at least one of alcohol and drug is determined to be contained in the breath of the user as a result of the at least one of alcohol determination and drug determination.

5. The vehicle key according to claim 4, wherein
the control unit has a function of performing the at least one of alcohol determination and drug determination within a predetermined period of time before and after the authentication.

6. The vehicle key according to claim 5, wherein
the sensing means is one of a voice, detection means for detecting voice of the user, and an image pickup means for picking up an image of an iris of an eye of the user.

7. The vehicle key according to claim 1, further comprising:
a position detection means for detecting that the projection member is accommodated in the holder portion; and
a memory unit for recording a detection result of the position detection means.

8. The vehicle key according to claim 1, wherein
the lock mechanism further includes a spring for urging the plunger toward the engaging position, and
the drive means presses the plunger to the evacuation position against the urging force of the spring in accordance with the detection result of the breath component detection means and releases the plunger upon lapse of a predetermined time.

9. the vehicle key according to claim 8, wherein the lock mechanism further includes:
a gear for pressing the plunger;
a position detection switch that is adapted to turn on when the plunger is moved to the evacuation position, and
the drive means comprises a motor having a head portion in mesh with the gear, the drive means being configured to start in accordance with the detection result of the breath component detection means so as to press the plunger through the gear, to stop when the position detection switch is turned on and thereafter to start upon lapse of a predetermined time to release the plunger through the gear, and to stop when the position detection switch is turned off.

10. The vehicle according to claim 1, wherein
the holder portion is configured as a two-piece structure including a first and a second cases, the second case accommodates the breath component detection means and the insert prevention means, and
the first case is fixed to a base end portion of the key portion with resin.

* * * * *